(12) United States Patent
Mishina et al.

(10) Patent No.: US 10,796,574 B2
(45) Date of Patent: Oct. 6, 2020

(54) DRIVING ASSISTANCE METHOD AND DEVICE

(71) Applicant: Nissan Motor Co., Ltd., Yokohama-shi, Kanagawa (JP)

(72) Inventors: Yohei Mishina, Kanagawa (JP); Susumu Fujita, Kanagawa (JP); Motonobu Aoki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 205 days.

(21) Appl. No.: 16/071,714

(22) PCT Filed: Dec. 8, 2016

(86) PCT No.: PCT/JP2016/086626
§ 371 (c)(1),
(2) Date: Jul. 20, 2018

(87) PCT Pub. No.: WO2017/126250
PCT Pub. Date: Jul. 27, 2017

(65) Prior Publication Data
US 2019/0027036 A1    Jan. 24, 2019

(30) Foreign Application Priority Data
Jan. 22, 2016    (JP) ................. 2016-010543

(51) Int. Cl.
*G08G 1/0968* (2006.01)
*G01C 21/26* (2006.01)
(Continued)

(52) U.S. Cl.
CPC ..... *G08G 1/096827* (2013.01); *B60W 30/095* (2013.01); *G01C 21/26* (2013.01);
(Continued)

(58) Field of Classification Search
CPC .. G08G 1/096827; G08G 1/052; G08G 1/056; G08G 1/096844; G08G 1/166;
(Continued)

(56) References Cited

U.S. PATENT DOCUMENTS

2009/0326751 A1    12/2009  Otake et al.
2011/0087433 A1*   4/2011   Yester ............. G01C 21/32
                                              701/301
(Continued)

FOREIGN PATENT DOCUMENTS

JP    2001183150 A    7/2001
JP    2006309445 A    11/2006
(Continued)

*Primary Examiner* — Aaron L Troost
(74) *Attorney, Agent, or Firm* — Young Basile Hanlon & MacFarlane, P.C.

(57) ABSTRACT

A driving assistance method includes extracting an interference traffic line that is a route along which another vehicle can move and that interferes with a planned travel route of a subject vehicle. The method also includes determining a necessary length of the extracted interference traffic line of the other vehicle, which length is necessary for determining a driving action of the subject vehicle, on the basis of at least one of a shape of a road, a traffic rule, and a traffic situation. The method further includes determining the driving action of the subject vehicle to respond to the other vehicle moving along the interference traffic line using a range of the determined necessary length of the interference traffic line as a determination object.

12 Claims, 17 Drawing Sheets

(51) Int. Cl.
*B60W 30/095* (2012.01)
*G08G 1/16* (2006.01)
*G01C 21/34* (2006.01)
*G08G 1/052* (2006.01)
*G08G 1/056* (2006.01)

(52) U.S. Cl.
CPC ......... *G01C 21/3492* (2013.01); *G08G 1/052* (2013.01); *G08G 1/056* (2013.01); *G08G 1/096844* (2013.01); *G08G 1/166* (2013.01)

(58) Field of Classification Search
CPC .. B60W 30/095; G01C 21/26; G01C 21/3492
See application file for complete search history.

(56) References Cited

U.S. PATENT DOCUMENTS

| | | | |
|---|---|---|---|
| 2012/0218093 A1* | 8/2012 | Yoshizawa | G08G 1/163 340/435 |
| 2016/0200317 A1 | 7/2016 | Danzl et al. | |
| 2017/0132930 A1* | 5/2017 | Ando | G08G 1/09626 |

FOREIGN PATENT DOCUMENTS

| | | | |
|---|---|---|---|
| JP | 2008152386 | A | 7/2008 |
| JP | 2011096105 | A | 5/2011 |
| JP | 2013196033 | A | 9/2013 |
| JP | 2015210544 | A | 11/2015 |
| WO | 2015024616 | A1 | 2/2015 |
| WO | 2015152794 | A1 | 10/2015 |

* cited by examiner

DRIVING ASSISTANCE METHOD AND DEVICE

CROSS-REFERENCE TO RELATED APPLICATIONS

The present application is based on Japanese Patent Application No. 2016-010543 filed Jan. 22, 2016, the entire content of which is herein incorporated by reference.

TECHNICAL FIELD

The present invention relates to a driving assistance method and a driving assistance apparatus that assist the driving of a vehicle.

BACKGROUND

A driving assistance device or apparatus is known which is incapable of direct perception by a sensor, but when the existence of a potential moving object such as a motorbike existing at a blind spot of another moving object such as a car is expected, estimates a possible route to calculate a risk of contact and determines the driving action on the basis of the calculated risk of contact (See JP2011-96105A).

However, when the perception by a sensor is not possible and the estimation of a possible route is also not possible, the risk of contact cannot be calculated and the driving action cannot be determined. If a searching range when determining the driving action is wide, therefore, the searching range is likely to involve a range in which the perception by a sensor is not possible, and a problem arises in that the determination of a driving action may be difficult.

SUMMARY

A problem to be solved by the present invention is to provide a driving assistance method and a driving assistance apparatus that are able to suppress the occurrence of a situation in which the determination of a driving action is difficult.

The present invention solves the above problem through extracting an interference traffic line that is a route along which another vehicle can move and that interferes with a planned travel route of a subject vehicle, determining a necessary length of the extracted interference traffic line of the other vehicle, which length is necessary for determining a driving action of the subject vehicle, on the basis of at least one of a shape of a road, a traffic rule, and searching for the other vehicle moving along the interference traffic line using a range of the determined necessary length of the interference traffic line as a determination object and determining the driving action of the subject vehicle to respond to the other searched vehicle.

According to the present invention, the range for search when determining the driving action of the subject vehicle can be set as an appropriate range in accordance with the necessity for determining the driving action of the subject vehicle. It is therefore possible to suppress the occurrence of a range in which perception is not possible in the range for search when determining the driving action and also to suppress the occurrence of a situation in which the determination of a driving action is difficult.

DETAILED DESCRIPTION

Hereinafter, one or more embodiments of the present invention will be described with reference to the drawings.

Figure 1:
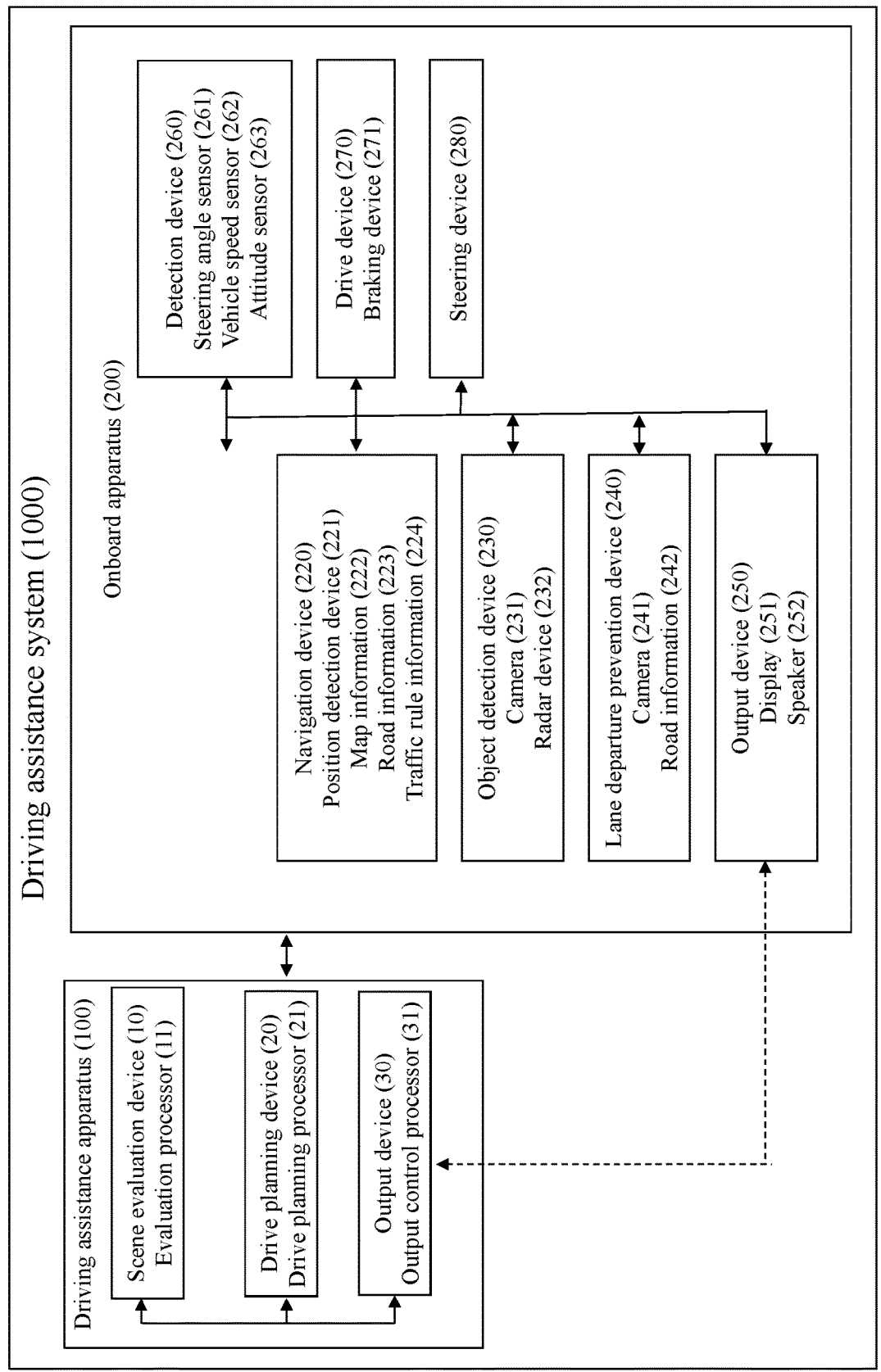
FIG. 1 is a block diagram illustrating a driving assistance system according to one or more embodiments of the present invention.

FIG. 1 is a diagram illustrating the block configuration of a driving assistance system 1000 according to one or more embodiments of the present invention. As illustrated in the figure, the driving assistance system 1000 comprises a driving assistance apparatus 100 and an onboard apparatus 200. The driving assistance apparatus 100 may be equipped in a vehicle or may also be applied to portable terminal devices that can exchange information with the onboard apparatus 200. Examples of such terminal devices include equipment, such as a smartphone and a PDA. The driving assistance system 1000, the driving assistance apparatus 100, the onboard apparatus 200, and various devices thereof may be provided with an arithmetic processing unit, such as one or more CPUs.

The onboard apparatus 200 comprises a vehicle controller 210, a navigation device 220, an object detection device 230, a lane departure prevention device 240, and an output device 250. These devices which constitute the onboard apparatus 200 are connected to one another via a controller area network (CAN) or other onboard LAN to mutually exchange information. The onboard apparatus 200 can exchange information with the driving assistance apparatus 100 via such an onboard LAN. The vehicle controller 210 operates in cooperation with a detection device 260, a drive device 270, and a steering device 280.

The detection device 260 comprises a steering angle sensor 261, a vehicle speed sensor 262, and an attitude sensor 263. The steering angle sensor 261 detects a steering amount, a steering speed, steering acceleration, and the like and outputs the detection signals to the vehicle controller 210. The vehicle speed sensor 262 detects a speed and/or acceleration of the vehicle and outputs the detection signals to the vehicle controller 210. The attitude sensor 263 detects a position of the vehicle, a pitch angle of the vehicle, a yaw angle of the vehicle, and a roll angle of the vehicle and outputs the detection signals to the vehicle controller 210. The attitude sensor 263 includes a gyrosensor.

The vehicle controller 210, which is an onboard computer such as an engine control unit (ECU), controls the travel driving, braking, and steering of the vehicle. The vehicle according to one or more embodiments of the present invention may be, for example, an electric car having an electric motor as the travel driving source, an engine car having an internal-combustion engine as the travel driving source, a hybrid car having both an electric motor and an internal-combustion engine as the travel driving sources, or the like. Examples of the electric car or hybrid car having an electric motor as the travel driving source include a type in which the power source for the electric motor is a secondary battery and a type in which the power source for the electric motor is a fuel cell.

The drive device 270 comprises an electric motor and/or an internal-combustion engine as the above-described travel driving sources, a power transmission device including a drive shaft and an automatic transmission that transmit the output of the travel driving source or sources to the driving wheels, a braking device 271 that brakes wheels, and other necessary components. The drive device 270 executes the travel control including acceleration and deceleration of the vehicle on the basis of control signals acquired from the vehicle controller 210 or input signals by an accelerator operation and a brake operation. In the case of a hybrid car, a ratio of the torque output to the electric motor and the torque output to the internal-combustion engine in accordance with the traveling state of the vehicle is also output from the vehicle controller 210 to the drive device 270.

The steering device 280 includes a steering actuator. The steering actuator includes a motor and other necessary components attached to the steering column shaft. The steering device 280 executes control of varying the traveling direction of the vehicle on the basis of control signals acquired from the vehicle controller 210 or input signals by a steering operation.

The vehicle controller 210 outputs control signals to the drive device 270 and the steering device 280 on the basis of a driving action plan which is output from a drive planning device 20 of the driving assistance apparatus 100. Here, control of the drive device 270 and/or control of the steering device 280 may be performed in a completely automated manner or in a form of assisting with the driving operation (traveling operation) of the driver. In this case, control of the drive device 270 and control of the steering device 280 are suspended/canceled by an intervention operation of the driver, such as steering and braking.

The navigation device 220 calculates a route from the current position of the subject vehicle to a destination. The scheme of calculating the route may be a known scheme at the time of filing of the present application based on a graph search algorithm, such as Dijkstra's algorithm or A* search algorithm. The calculated route is output to the driving assistance apparatus 100 to be used for the driving assistance for the subject vehicle. The calculated route is also presented as route guidance information by the output device 250.

The navigation device 220 includes a position detection device 221. The position detection device 221 is responsible to the Global Positioning System (GPS) and detects a traveling position (latitude/longitude) of the vehicle traveling.

The navigation device 220 includes a database that stores accessible map information 222, road information 223, and traffic rule information 224. It suffices that the database storing the map information 222, road information 223, and traffic rule information 224 can be read by the navigation device 220, and the database may be configured to be physically separated from the navigation device 220 or may also be stored in a server from which the stored information is readable via a communication network.

The map information 222 is a so-called electronic map that represents information in which the latitude and longitude are associated with the map information. The map information 222 includes the road information 223 which is associated with each point.

The road information 223 is defined by nodes and links connecting between nodes. The road information 223 includes information for specifying a road by a position/region of the road, information on the road type and road width of each road, and other information regarding roads. The road information 223 also includes information regarding an intersection which is associated with identification information of each road link. The information regarding an intersection includes information on the position of an intersection, the entering direction into the intersection, the type of the intersection, and traffic lines in the intersection. The road information 223 further includes information on the shape of a road, whether or not the straight-ahead traveling is permitted, the priority relationship in traveling, whether or not the overtaking is permitted (whether or not the lane change to an adjacent lane is permitted), presence or absence of a traffic signal, etc. as the information regarding a road which is associated with the identification information of each road link.

The traffic rule information 224 is information regarding traffic rules on a route, such as STOP, NO PARKING/NO STOPPING, SLOW, and SPEED LIMIT, which the vehicle must follow when traveling. Each traffic rule is defined for each point (latitude, longitude) and each link. The traffic rule information 224 may include information on traffic signals which is acquired from an apparatus provided on the road side.

The object detection device 230 detects the existence and existing positions of objects including obstacles that may exist around the subject vehicle. Although not particularly limited, the object detection device 230 includes a camera 231. Examples of the camera 231 include an imaging device comprising an imaging element such as a CCD, an infrared camera, and a stereo camera. The camera 231 is disposed at a certain position of the subject vehicle and captures images of objects around the subject vehicle. The term "around the subject vehicle" as used herein encompasses the concepts of "ahead of the subject vehicle," "behind the subject vehicle," "sideways ahead of the subject vehicle," and "sideways behind the subject vehicle." Examples of objects imaged by the camera 231 include stationary objects such as traffic signals and traffic signs, moving objects such as pedestrians and other vehicles such as two-wheel vehicles and four-wheel vehicles, and road structures such as guardrails, median strips, and curbstones.

The object detection device 230 may analyze the image data and identify the type of an object on the basis of the analysis result. In this case, the object detection device 230 uses a pattern matching technique or the like to identify whether the object included in the image data is a vehicle, a pedestrian, or a traffic sign. In addition or alternatively, the object detection device 230 may process the acquired image data to detect the distance from the subject vehicle to an object existing around the subject vehicle or the relative positional relationship between the object and the subject vehicle on the basis of the position of the object.

The object detection device 230 may include a radar device 232. Examples of the radar device 232 include those, such as millimeter-wave radar, laser radar, and ultrasonic radar, which are of schemes known at the time of filing of the present application. The object detection device 230 detects presence or absence of objects, positions of the objects, and distances to the objects on the basis of received signals from the radar device 232. The object detection device 230 may detect presence or absence of objects, positions of the objects, and distances to the objects on the basis of clustering results of point cloud information which is acquired using laser radar.

When the subject vehicle and another vehicle are capable of vehicle-to-vehicle communication, the object detection device 230 may acquire the vehicle speed and acceleration of the other vehicle which are detected by the vehicle speed sensor of the other vehicle, as object information. In addition or alternatively, the object detection device 230 can acquire the object information, which includes the position, speed, and acceleration of another vehicle, from external devices of the Intelligent Transport Systems (ITS).

The lane departure prevention device 240 includes a camera 241 and a database that stores road information 242. The camera 231 of the object detection device may be shared as the camera 241. The road information 223 of the navigation device may be shared as the road information 242. The lane departure prevention device 240 has a lane departure prevention function (lane keep support function) of recognizing a lane in which the subject vehicle is traveling from the images captured by the camera 241 and controlling the moving behavior of the subject vehicle so as to keep a certain relationship between the position of a lane marker of the lane and the position of the subject vehicle. The driving assistance apparatus 100 plans a driving action such that the subject vehicle travels along the center of the lane. In addition or alternatively, the driving assistance apparatus 100 may plan a driving action such that the distance from a lane marker of the lane to the subject vehicle along the road width direction falls within a predetermined range of value. The lane marker is not limited, provided that it has a function of defining a lane. The lane marker may be a diagrammatic mark drawn on a road surface, a planting that exists between lanes, or a road structure that exists on the side of a road shoulder of a lane, such as a guardrail, a curbstone, a sidewalk, or an exclusive road for two-wheel vehicles. The lane marker may also be a fixed structure that exists on the side of a road shoulder of a lane, such as an advertising display, a traffic sign, a store, or a roadside tree.

An evaluation processor 11, which will be described later, stores an object detected by the object detection device 230 so that the detected object is associated with a route. In other words, the evaluation processor 11 retains information as to which route the object exists on.

The onboard apparatus 200 includes the output device 250. The output device 250 includes a display 251 and a speaker 252. The output device 250 outputs various information items regarding the driving assistance to the user or to passengers of surrounding vehicles. The various information items regarding the driving assistance include those regarding a driving action plan and travel control based on the driving action plan. The output device 250 preliminarily informs the subject vehicle's passengers that the steering operation and/or acceleration or deceleration will be executed via the display 251 and/or speaker 252, as information in accordance with the control information for the subject vehicle to travel on a planned travel route. In addition or alternatively, the passengers of the subject vehicle or the passengers of other vehicles may be preliminarily informed of such information items regarding the driving assistance via exterior lamps and/or interior lamps. In addition or alternatively, various information items regarding the driving assistance may be output to external devices of the Intelligent Transport Systems (ITS) and the like via a communication network.

The driving assistance apparatus 100 comprises a scene evaluation device 10, a drive planning device 20, and an output device 30. The output device 30 achieves the same functions as those of the previously-described output device 250 of the onboard apparatus 200 using the display 251 and the speaker 252. These devices can exchange information with one another via wired or wireless communication lines.

The scene evaluation device 10 includes an evaluation processor 11 that serves as a control device of the scene evaluation device 10. The evaluation processor 11 is a calculation device that is used to, when determining a driving action of the subject vehicle, evaluate a scene which the subject vehicle traveling on a route encounters. Specifically, the evaluation processor 11 is a computer comprising a read only memory (ROM) that stores programs for executing a process of evaluating a scene which the subject vehicle encounters, a central processing unit (CPU) as an operation circuit that executes the programs stored in the ROM to serve as the scene evaluation device 10, and a random access memory (RAM) that serves as an accessible storage device. The evaluation processor 11 is provided with a storage medium that stores programs for executing the process of evaluating a scene which the subject vehicle encounters.

The evaluation processor 11 of the scene evaluation device 10 executes the following processes:

(1) a process of acquiring the current position of the subject vehicle and a target route (subject vehicle information acquisition process);

(2) a process of acquiring external world information around the subject vehicle (external world information acquisition process);

(3) a process of extracting another vehicles' traffic line having a point of intersection (interference point) with a planned travel route of the subject vehicle (this traffic line will be referred to as an "interference traffic line," hereinafter) (interference traffic line extraction process); and (4) a process of changing the length of the extracted interference traffic line to a length necessary for determining a driving action (referred to as a "necessary length," hereinafter) (interference traffic line length changing process).

The term "traffic line" as used herein refers to concepts including not only lines with which the width may be inconceivable but also those, such as lanes and roads, with which the width is conceivable.

The evaluation processor 11 has a block that realizes a subject vehicle information acquisition function, a block that realizes an external world information acquisition function, a block that realizes an interference traffic line extraction function, and a block that realizes an interference traffic line length changing process. The evaluation processor 11 executes each of the above functions by cooperation of software for realizing each function and the above-described hardware.

In the subject vehicle information acquisition process, the evaluation processor 11 acquires the current position of the subject vehicle and a target route from the current position of the subject vehicle to a destination, from the navigation device 220. In the external world information acquisition process, the evaluation processor 11 acquires the external world information including the state of traffic signals around the subject vehicle, the presence or absence of other vehicles traveling in parallel, etc., from the object detection device 230 or utilizing a communication network.

In the interference traffic line extraction process, the evaluation processor 11 calculates a planned travel route of the subject vehicle on the basis of the current position of the subject vehicle, the target route, the map information 222, and the road information 223 and extracts another vehicles' traffic line having a point of intersection (interference point) with the planned travel route of the subject vehicle. The evaluation processor 11 calculates the planned travel route which is different from the target route calculated by the navigation device 220 and in which even the traveling lane for the subject vehicle is specified. Examples of the method of calculating the planned travel route include calculation methods based on a graph search algorithm, such as Dijkstra's algorithm or A* search algorithm. Such a calculation method includes setting links that represent the travel route and nodes that are points at which the links are connected to one another and setting a weighting for each of the links. Here, the weighting is set small for a recommended link corresponding to the lane for traveling toward the destination and set large for a link that is not the recommended link. Then, a lane in which the total sum of weightings from the current position of the subject vehicle to the destination is small is specified as the lane of the planned travel route.

The evaluation processor 11 refers to the road information 223 to extract the interference traffic line of another vehicle. Information on the interference traffic line may be acquired from a database equipped in the subject vehicle or may also be acquired from an external database via a communication network.

Figure 2:
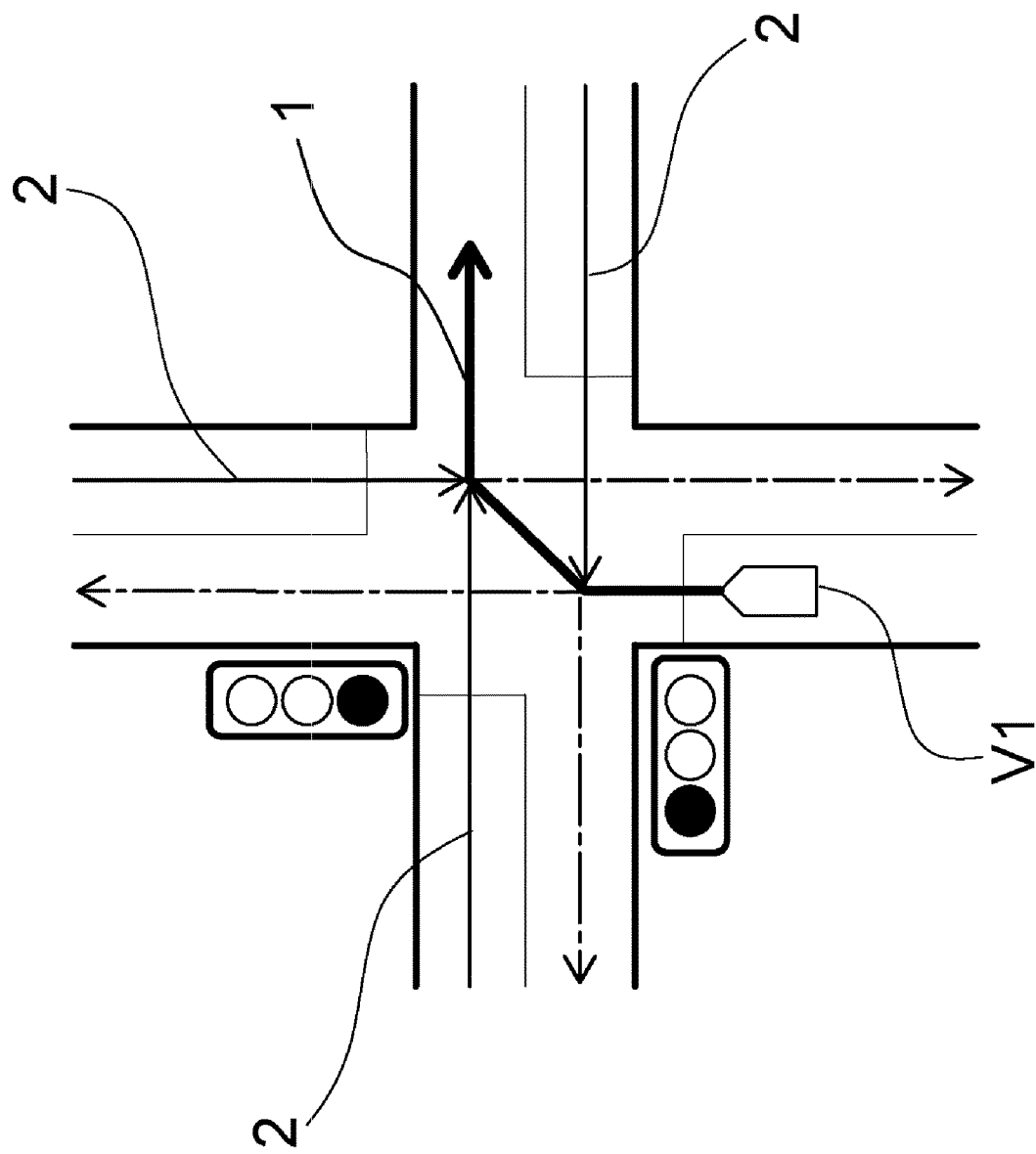
FIG. 2 is a diagram for describing a method of extracting traffic lines of other vehicles at an intersection.

FIG. 2 is a diagram for describing a method of extracting interference traffic lines 2 of other vehicles passing through an intersection. In the figure, a planned travel route 1 of the subject vehicle V1 is indicated by a thick solid line and the traffic lines of other vehicles are indicated by thin solid lines or dashed-dotted lines. As illustrated in the figure, one traffic line exists in each lane, and the traffic lines indicated by thin solid lines are the interference traffic lines 2 of other vehicles extracted by the evaluation processor 11.

Figure 3:
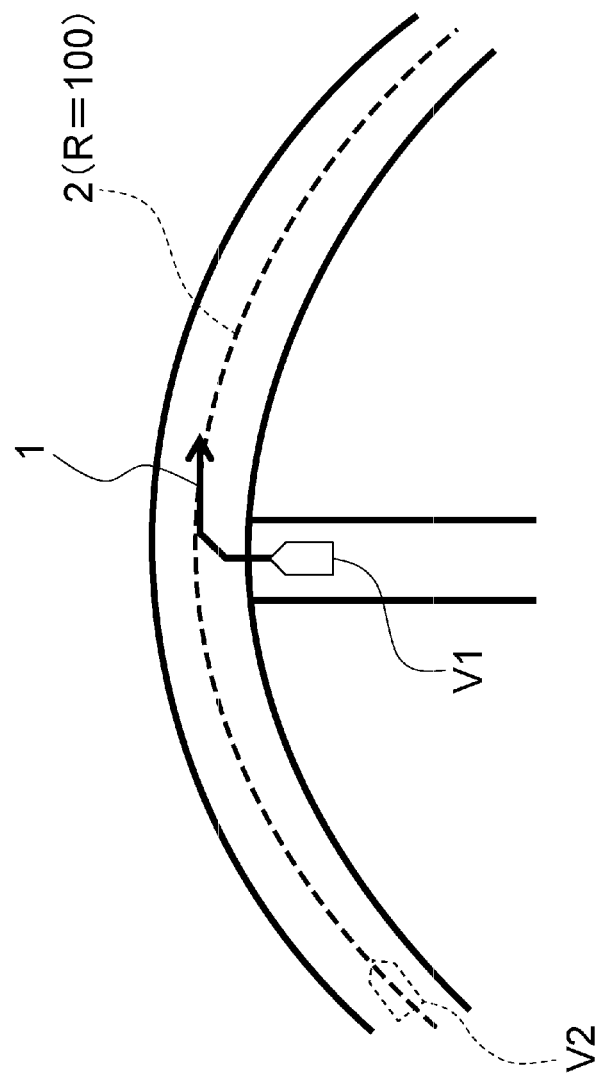
FIG. 3 is a diagram for describing a method of extracting an interference traffic line of another vehicle belonging to a curve section of a road in a scene in which the subject vehicle turns right to merge into the curve section of the road.

FIG. 3 is a diagram for describing a method of extracting an interference traffic line 2 of another vehicle V2 belonging to a curve section of a road in a scene in which the subject vehicle V1 turns right to merge into the curve section of the road. In this figure, the planned travel route 1 of the subject vehicle V1 is indicated by a thick solid line and the interference traffic line 2 of another vehicle V2 is indicated by a broken line.

In the interference traffic line length changing process, the evaluation processor 11 changes the length of the interference traffic line 2 of another vehicle V2 extracted in the interference traffic line extraction process to the necessary length. Examples of the method of changing the length of the interference traffic line 2 include a method of changing the length in accordance with deceleration of the other vehicle V2 traveling along the interference traffic line 2, a method of changing the length in accordance with the state of a traffic signal, a method of changing the length in accordance with the priority level under a traffic rule of the other vehicle at a merging point at which two or more interference traffic lines 2 merge into one another, and a method of changing the length in accordance with the planned travel route of another vehicle traveling parallel to the subject vehicle V1 and the priority level under a traffic rule.

Figure 4:
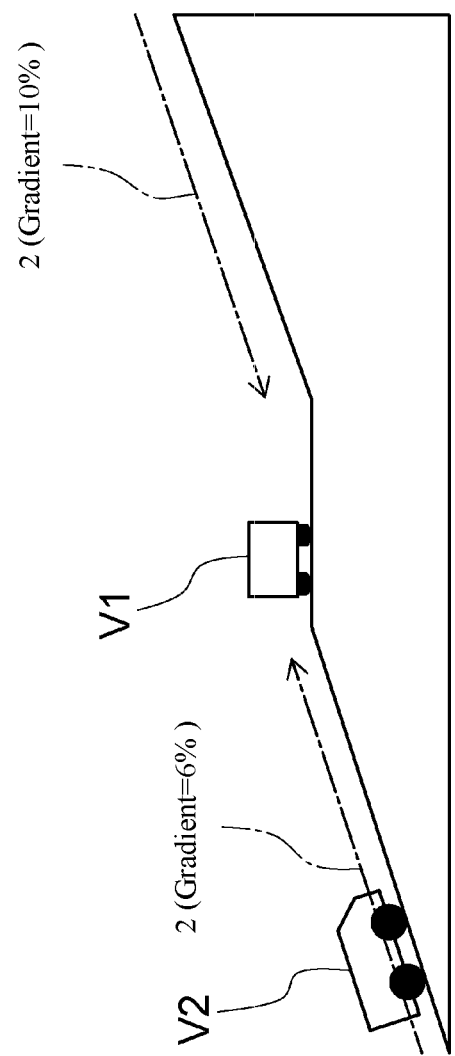
FIG. 4 is a diagram for describing a method of determining the necessary length of the interference traffic line of another vehicle belonging to a road with a gradient.

The interference traffic line length changing function of the evaluation processor 11 includes a road shape analysis function. In a road shape analysis process, the evaluation processor 11 refers to the map information 222 and the road information 223 to analyze the shape of a road to which the interference traffic line belongs. Examples of the shape of a road include a shape that causes deceleration of another vehicle V2 traveling along the interference traffic line 2, such as an intersection (see FIG. 2), a shape in which a merging path abuts against a curve section (see FIG. 3), a shape with a gradient (see FIG. 4), a shape with a bump 8 on a road surface (see FIG. 5), or a shape with a railroad crossing 9 (see FIG. 6).

Figure 5:
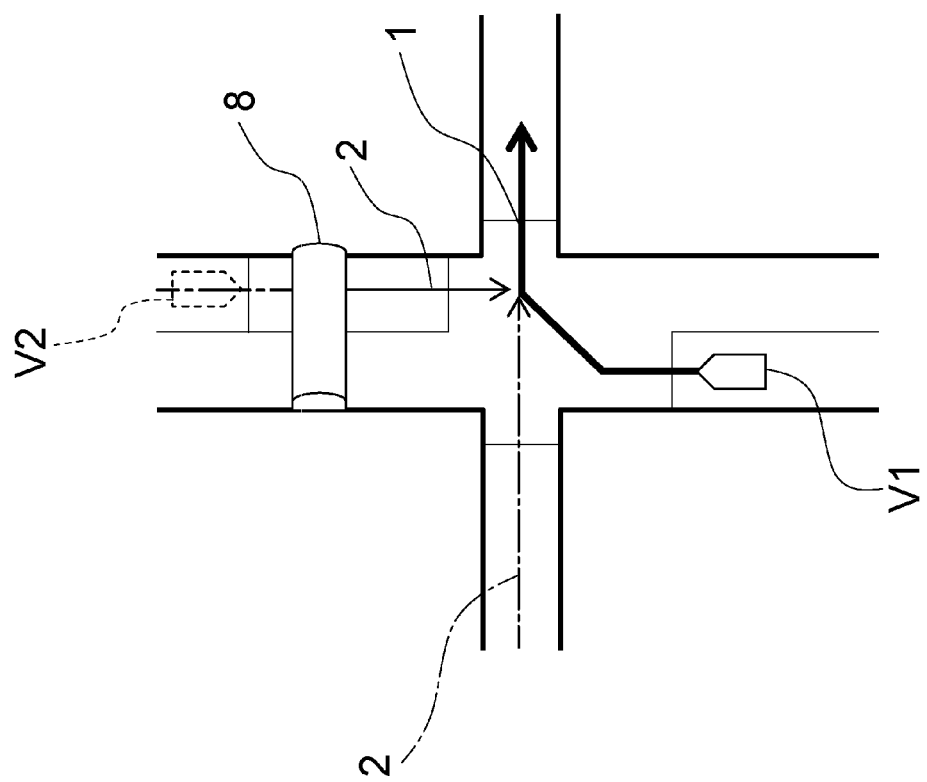
FIG. 5 is a diagram for describing a method of determining the necessary length of the interference traffic line of another vehicle belonging to a road with a bump on the road surface.
Figure 6:
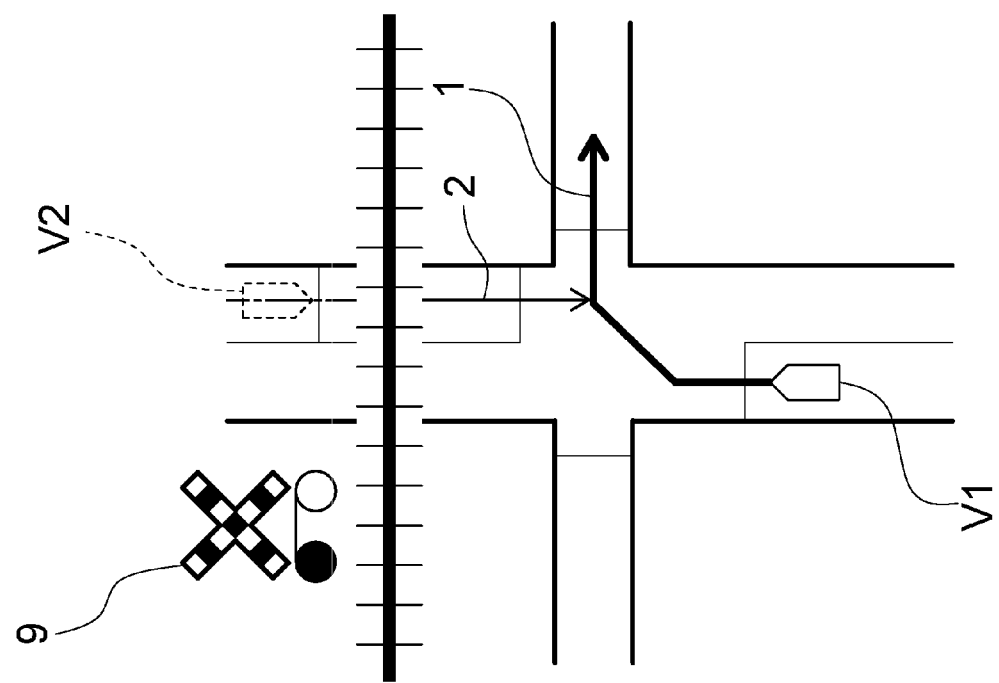
FIG. 6 is a diagram for describing a method of determining the necessary length of the interference traffic line of another vehicle belonging to a road with a railroad crossing.

Examples of information regarding the road shape included in the road information 223 include the curvature radius of a traffic line that belongs to the curve section of a road (e.g. R=100 m, see FIG. 3), the gradient of a road (e.g. 6% and 10%, see FIG. 4), the height and position of a bump 8 (see FIG. 5), and the position of a railroad crossing 9 (see FIG. 6).

The interference traffic line length changing function of the evaluation processor 11 includes a moving speed management function. In a moving speed management process, the evaluation processor 11 calculates an estimated value of the moving speed of another vehicle V2 traveling along the interference traffic line 2 on the basis of the road shape analyzed in the road shape analysis process. Then, in the moving speed management process, the evaluation processor 11 determines the necessary length of the interference traffic line 2 of the other vehicle V2 on the basis of the calculation result of the estimated value of the moving speed of the other vehicle V2.

In the moving speed management process, the evaluation processor 11 determines whether or not another vehicle V2 traveling along the planned travel route 1 decelerates, on the basis of the road shape analyzed in the road shape analysis process. The evaluation processor 11 determines that another vehicle V2 traveling along the interference traffic line 2 decelerates in a certain case, such as when an intersection exists on the interference traffic line 2, when the curvature radius of the curve section of a road is a predetermined value or more, when the gradient of a road is a predetermined value or more, or when a bump 8 or a railroad crossing 9 exists.

When a determination is made that another vehicle V2 traveling along the interference traffic line 2 does not decelerate, the evaluation processor 11 calculates the estimated value of the moving speed of the other vehicle V2 as a limit speed, an average speed, or the like. That is, in this case, the moving speed of the other vehicle V2 is estimated on the basis of the assumption that the other vehicle V2 moves at a constant speed. The limit speed may be acquired from the road information 223 or may also be acquired via a communication network. As for the average speed, the average speed of probe car data (floating car data) obtained by collecting the moving speed of vehicles connected to a communication network may be acquired via the communication network and employed.

When a determination is made that another vehicle V2 traveling along the interference traffic line 2 decelerates, the evaluation processor 11 calculates the estimated value of the moving speed of the other vehicle V2 in accordance with the deceleration. For example, as illustrated in FIG. 3, when the interference traffic line 2 of the other vehicle V2 belongs to the curve section of a road, the upper limit lateral acceleration generated in the other vehicle V2 is set in accordance with the curvature radius of the curve section of the road, and the estimated value of the moving speed of the other vehicle V2 is calculated as a speed corresponding to the set upper limit lateral acceleration. That is, in this case, the moving speed of the other vehicle V2 is estimated on the basis of the assumption that the other vehicle V2 decelerates to a speed that allows the other vehicle V2 to travel in the curve section in a state of receiving the upper limit lateral acceleration because, in general, the other vehicle V2 passes through the curve section at a speed in accordance with the curvature of the curve section in order to prevent deviation to the outside of the road and to ensure the comfortable ride. As for the moving speed of the other vehicle V2 when passing through the curve section of a road, the average speed of the probe car data may be acquired via a communication network and employed.

In the scene illustrated in FIG. 3, the other vehicle V2 decelerates when entering the curve section of the road and then moves in the curve section of the road at a constant speed. In the scene illustrated in FIG. 4, the other vehicle V2 decelerates when entering the road with a gradient and then passes through the road at a constant speed. In the scene illustrated in FIG. 2, another vehicle traveling straight ahead in the intersection passes through the intersection at a constant speed. As described above, when the moving speed of another vehicle moving along the interference traffic line 2 is a constant speed, the evaluation processor 11 calculates the necessary length of the interference traffic line 2 on the basis of the estimated value of the moving speed which is assumed as a constant speed. In this operation, the evaluation processor 11 calculates the necessary length of the interference traffic line 2 on the basis of the time to collision (TTC) between the other vehicle V2 moving at a constant speed and the subject vehicle V1. For example, when the time to collision with another vehicle moving at 60 km/h is 5.0 seconds, the necessary length of the interference traffic line 2 is about 83 m.

Figure 7:
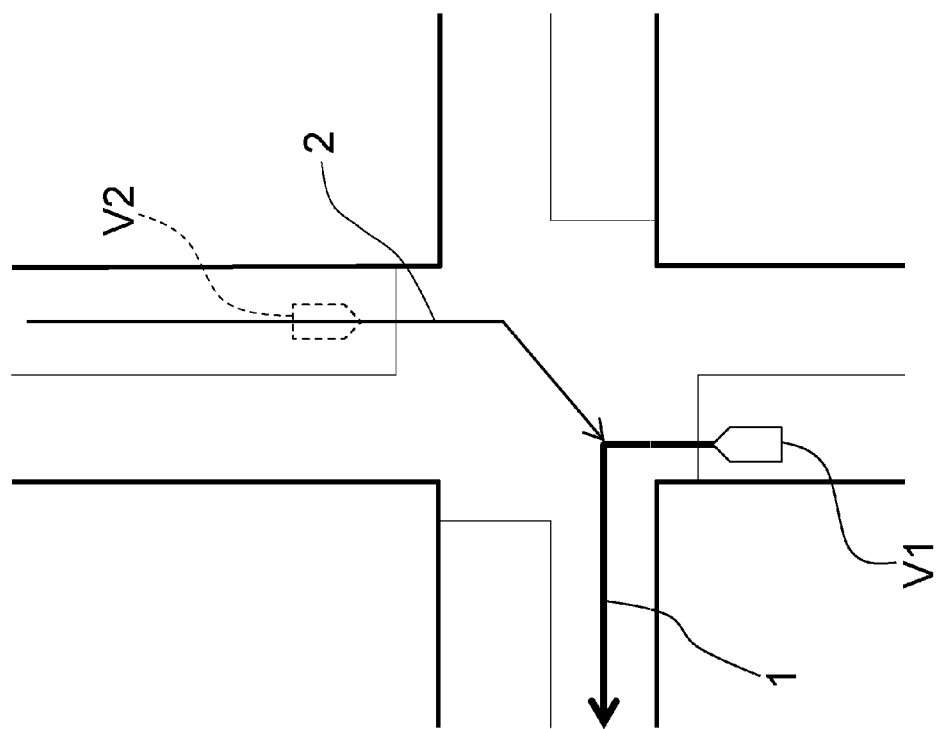
FIG. 7 is a diagram for describing a method of determining the necessary length of the interference traffic line of another vehicle in a scene in which the subject vehicle turns left at an intersection and the other vehicle turns right at the intersection.

On the other hand, in the scene illustrated in FIG. 5, the other vehicle V2 decelerates when passing through the bump 8 and then accelerates until the other vehicle V2 reaches the interference point with the planned travel route 1 of the subject vehicle V1. In the scene illustrated in FIG. 6, the other vehicle V2 makes a stop at the railroad crossing 9 and then accelerates until the other vehicle V2 reaches the interference point with the planned travel route 1 of the subject vehicle V1. In the scene illustrated in FIG. 7 in which the subject vehicle V1 turns left at the intersection and the other vehicle V2 turns right at the intersection, the other vehicle V2 enters the intersection after deceleration to 20 to 30 km/h and then accelerates to pass through the intersection. When acceleration and deceleration occur in the other vehicle V2 as in these scenes, the evaluation processor 11 calculates the necessary length of the interference traffic line 2 on the assumption that the acceleration and deceleration are constant acceleration. For example, in the scene illustrated in FIG. 7, provided that the speed when passing through the intersection (inflection point of the interference traffic line in the figure) is 20 km/h, the acceleration and deceleration is 0.3 G, the distance from the lowest speed point to the interference point with the planned travel route 1 of the subject vehicle V1 is 15 m, and the acceleration takes place from the lowest speed point to the interference point, the time from the lowest speed point to the interference point is 1.87 sec, the time from the start point of the interference traffic line 2 to the lowest speed point is 3.19 seconds, and the distance from the start point of the interference traffic line 2 to the lowest speed point is 32.84 m. Thus, the necessary length of the interference traffic line 2 is 47.84 m.

The interference traffic line length changing function of the evaluation processor 11 includes a signal information management function. In a signal information management process, the evaluation processor 11 manages the information on traffic signals acquired from the object detection device 230 or the like and changes the length of the interference traffic line 2 to the necessary length in accordance with the state of the traffic signals. The information on the traffic signals may also be acquired via a communication network.

Figure 8:
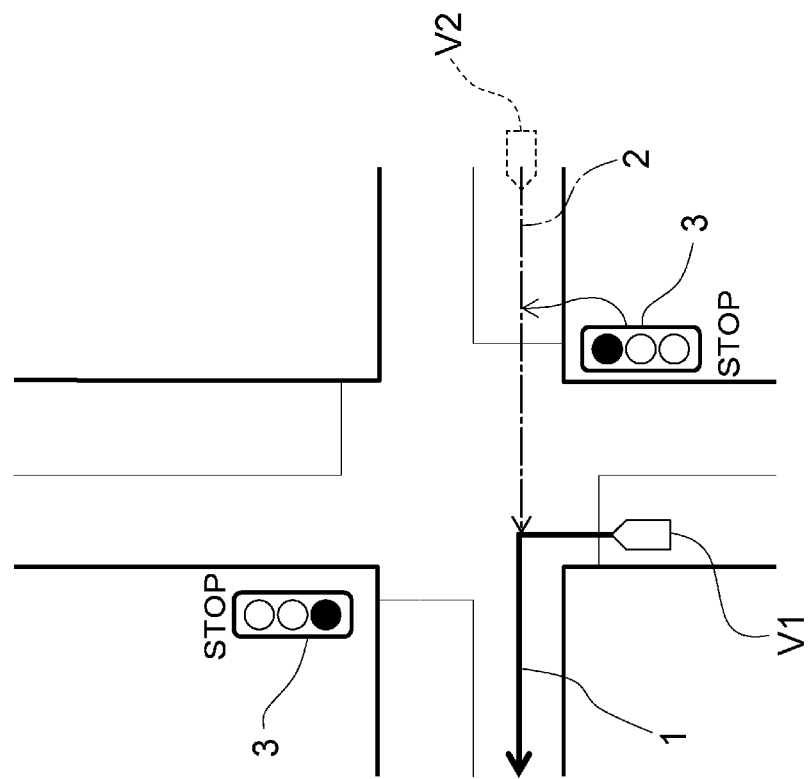
FIG. 8 is a diagram for describing a process of determining the length of the interference traffic line in accordance with the state of traffic signals at an intersection.

FIG. 8 is a diagram for describing a process of determining the necessary length of the interference traffic line 2 in accordance with the state of traffic signals at an intersection. In the scene illustrated in this figure, the subject vehicle V1 turns left at the intersection, but the interference traffic line 2 of another vehicle V2 exists which merges into the planned travel route 1 of the subject vehicle V1 from the right side, and the traffic signal 3 corresponds to the interference traffic line 2.

In the signal information management process, the evaluation processor 11 determines whether the traffic signal 3 corresponding to the interference traffic line 2 is in a passable state, such as a green signal or a straight arrow signal, or in an impassable state, such as a red signal. Then, when the traffic signal 3 corresponding to the interference traffic line 2 is in the passable state, the evaluation processor 11 estimates the moving speed of the other vehicle V2 traveling along the interference traffic line 2 corresponding to the traffic signal 3 as a given constant speed such as a limit speed or an average speed, and calculates the necessary length of the interference traffic line 2 in accordance with the estimated speed. On the other hand, when the traffic signal 3 corresponding to the interference traffic line 2 is in the impassable state, the evaluation processor 11 sets the necessary length of the interference traffic line 2 corresponding to the traffic signal 3 to 0 m. That is, the evaluation processor 11 does not refer to the interference traffic line 2 corresponding to the traffic signal 3 in the impassable state because the other vehicle V2 does not travel along the interference traffic line 2 under the traffic rules.

The interference traffic line length changing function of the evaluation processor 11 includes a priority level analysis function. In a priority level analysis process, the evaluation processor 11 refers to the road information 223 and the traffic rule information 224 to analyze the priority levels under the traffic rules of a plurality of interference traffic lines 2 that merge into one another, and changes the lengths of the interference traffic lines 2 to respective necessary lengths in accordance with the priority levels. Information on the priority levels may also be acquired via a communication network.

Figure 9:
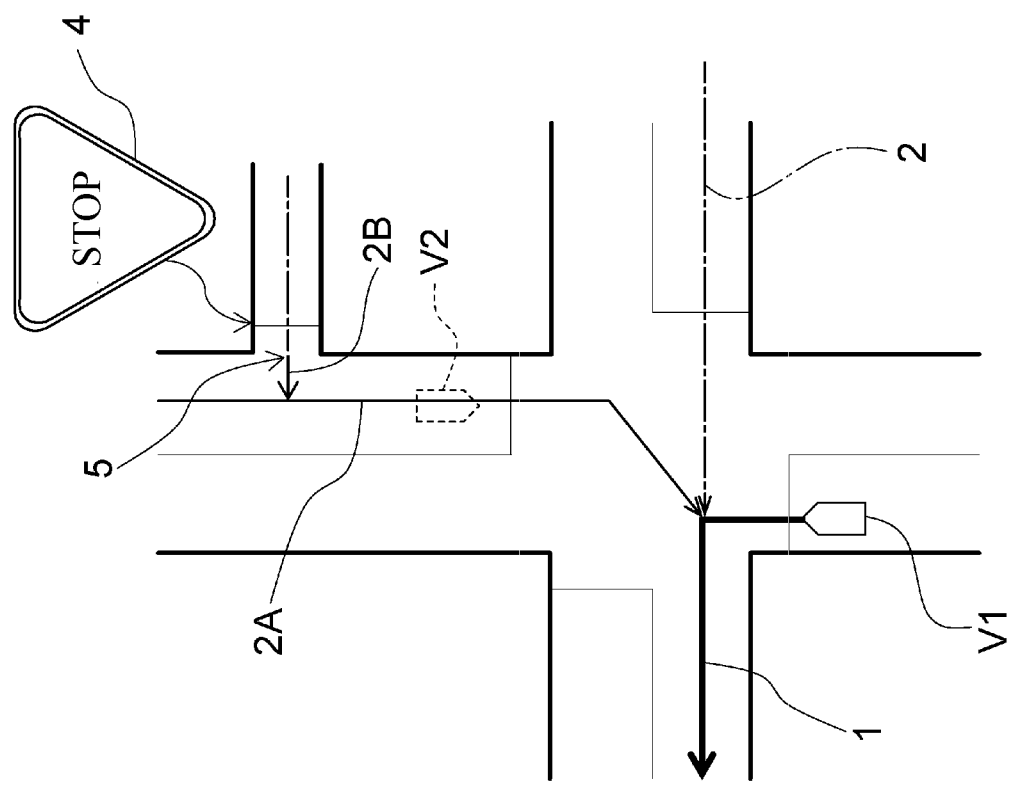
FIG. 9 is a diagram for describing a process of determining the necessary lengths of two interference traffic lines merging into each other in accordance with the priority levels of the interference traffic lines.

FIG. 9 is a diagram for describing a process of determining the necessary lengths of two interference traffic lines 2 merging into each other in accordance with the priority levels of the interference traffic lines 2. The scene illustrated in this figure includes an interference traffic line 2A for traveling straight ahead toward the intersection and an interference traffic line 2B belonging to a road that abuts against the road to which the interference traffic line 2A belongs. The road to which the interference traffic line 2B belongs is provided with a traffic sign 4 of STOP. Accordingly, the moving speed of the other vehicle V2 traveling along the interference traffic line 2 is 0 km/h in the vicinity of the intersection 5 between the road to which the interference traffic line 2A belongs and the road to which the interference traffic line 2B belongs. Thus, the road to which the interference traffic line 2A belongs is a priority road to the interference traffic line 2B under the traffic rules.

In the priority level analysis process, the evaluation processor 11 determines which of the interference traffic line 2A and the interference traffic line 2B has a higher priority level. In the scene illustrated in FIG. 9, a determination is made that the interference traffic line 2A has a higher priority than that of the interference traffic line 2B. The evaluation processor 11 estimates the moving speed of the other vehicle V2 traveling along the interference traffic line 2B as 0 km/h in the vicinity of the intersection 5 and as a speed achieved by accelerating from 0 km/h at certain constant acceleration (e.g. 0.3 G) on the side closer to the interference traffic line 2 than the vicinity of the intersection 5. Then, the evaluation processor 11 determines the necessary length of the interference traffic line 2B on the basis of the estimated value of the moving speed of the other vehicle V2. In the scene illustrated in FIG. 9, the necessary length of the interference traffic line 2B is a length from the vicinity of the intersection 5 between the road to which the interference traffic line 2A belongs and the road to which the interference traffic line 2B belongs, to the interference traffic line 2A. That is, the interference traffic line 2B is divided into a closer side to the interference traffic line 2A (indicated by a solid line in FIG. 9) and a farther side from the interference traffic line 2A (indicated by a dashed-dotted line in FIG. 9) with respect to the intersection 5, and the closer side is selected as a necessary portion while the farther side is excluded as an unnecessary portion.

The interference traffic line length changing function of the evaluation processor 11 includes a traffic situation management function. In a traffic situation management process, when the planned travel route of another vehicle traveling parallel to the subject vehicle V1 (referred to as a "parallel traveling vehicle," hereinafter) intersects with the interference traffic line 2 of still another vehicle V2, the evaluation processor 11 changes the length of the interference traffic line 2 to the necessary length in accordance with the priority level under the traffic rules. The planned travel route of the parallel traveling vehicle is acquired by the object detection device 230.

Figure 10:
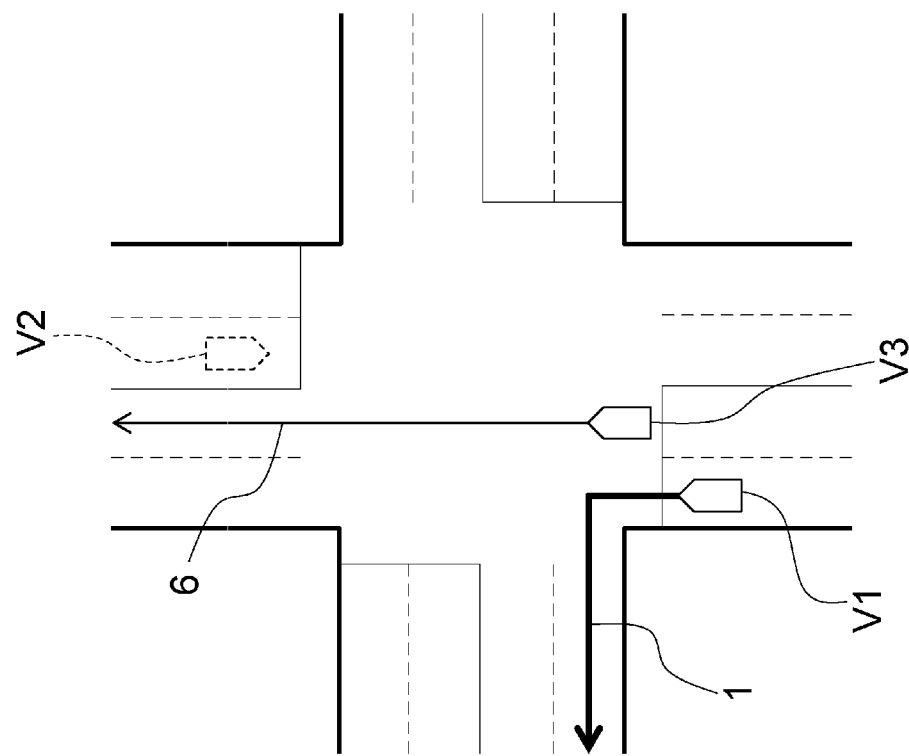
FIG. 10 is a diagram for describing a process of determining the necessary length of the interference traffic line at an intersection in accordance with the planned travel route of a parallel traveling vehicle and the traffic rules.
Figure 11:
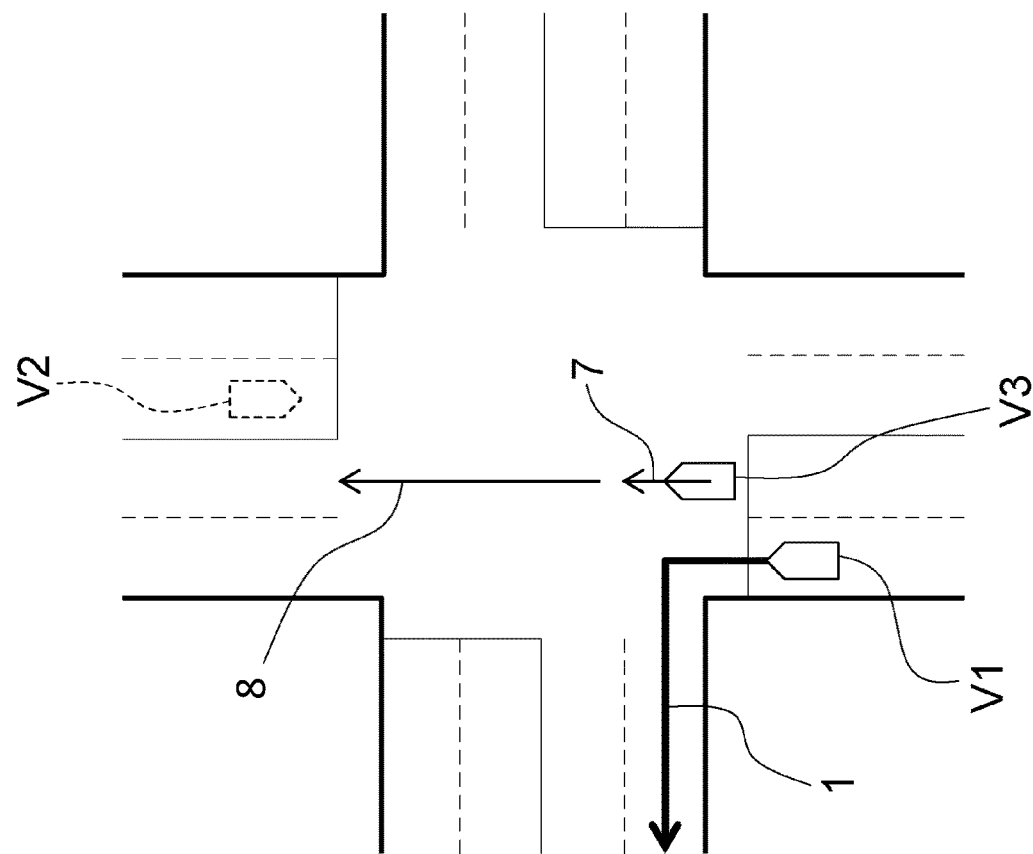
FIG. 11 is a diagram for describing the process of determining the necessary length of the interference traffic line at the intersection in accordance with the planned travel route of the parallel traveling vehicle and the traffic rules.
Figure 12:
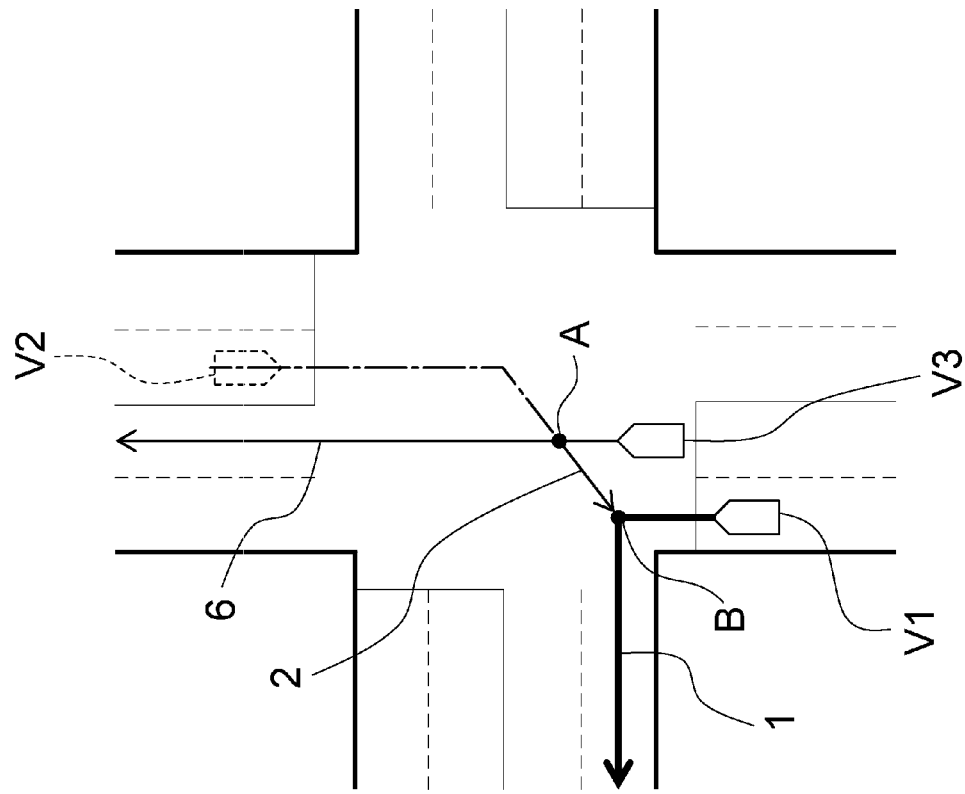
FIG. 12 is a diagram for describing the process of determining the necessary length of the interference traffic line at the intersection in accordance with the planned travel route of the parallel traveling vehicle and the traffic rules.

FIG. 10 to FIG. 12 are diagrams for describing a process of determining the necessary length of the interference traffic line 2 at an intersection in accordance with a planned travel route 6 of a parallel traveling vehicle V3 and the priority level under the traffic rules. As illustrated in these figures, when the parallel traveling vehicle V3 entering the intersection exists, the evaluation processor 11 calculates the planned travel route 6 of the parallel traveling vehicle V3 in the traffic situation management process. In the process of calculating the planned travel route 6 of the parallel traveling vehicle V3, first, the evaluation processor 11 acquires information on the positions, speeds, and movement vectors of other vehicles around the subject vehicle V1 from the object detection device 230 or the like. The information on other vehicles around the subject vehicle V1 may also be acquired by vehicle-to-vehicle communication or road-to-vehicle communication.

The evaluation processor 11 compares the vector 7 (see FIG. 11) of another vehicle acquired from the object detection device 230 or the like with the traffic line 8 of this other vehicle on the traveling lane. When the vector 7 and the traffic line 8 are in the same direction, the evaluation processor 11 employs the traffic line 8 on the traveling lane as the planned travel route 6 of the parallel traveling vehicle V3.

As illustrated in FIG. 12, when the planned travel route 6 of the parallel traveling vehicle V3 intersects with the interference traffic line 2 of another vehicle V2, the evaluation processor 11 calculates the priority levels of the parallel traveling vehicle V3 and the other vehicle V2 traveling along the interference traffic line 2. Here, the priority levels of vehicles passing through an intersection are determined by the traffic rules. For example, as illustrated in FIG. 12, the parallel traveling vehicle V3 has a higher priority level than that of the other vehicle V2 turning right at the intersection because the parallel traveling vehicle V3 is traveling straight ahead in the oncoming lane. The evaluation processor 11 therefore calculates the priority levels of the parallel traveling vehicle V3 traveling on the planned travel route 6 and the other vehicle V2 traveling along the interference traffic line 2 on the basis of the traffic rules.

When the priority level of the parallel traveling vehicle V3 traveling on the planned travel route 6 is higher than the priority level of the other vehicle V2 traveling along the interference traffic line 2, the evaluation processor 11 sets the necessary length of the interference traffic line 2 to a length from a point of intersection A between the planned travel route 6 of the parallel traveling vehicle V3 and the interference traffic line 2 of the other vehicle V2 to a point of intersection B between the planned travel route 1 of the subject vehicle V1 and the interference traffic line 2. That is, the interference traffic line 2 of the other vehicle V2 is divided into a closer side to the planned travel route 1 of the subject vehicle V1 (indicated by a solid line in FIG. 12) and a farther side from the planned travel route 1 of the subject vehicle V1 (indicated by a dashed-dotted line in FIG. 12) with respect to the point of intersection A, and the closer side is selected as a necessary portion while the farther side is excluded as an unnecessary portion.

As illustrated in FIG. 1, the drive planning device 20 includes a drive planning processor 21. The drive planning processor 21 plans a driving action of the subject vehicle V1 traveling along the planned travel route 1. The drive planning processor 21 acquires information on the necessary length of the interference traffic line 2 from the evaluation processor 11. The drive planning processor 21 plans the driving action to avoid contact of the subject vehicle V1 with objects existing around the subject vehicle V1 in accordance with the relationship between the interference traffic line 2, of which the necessary length is determined by the evaluation processor 11, and the subject vehicle V1 and the existence of objects detected by the object detection device 230.

The drive planning processor 21 is a computer comprising a read only memory (ROM) that stores programs for executing a process of planning the driving actions including traveling/stopping of the subject vehicle, a central processing unit (CPU) as an operation circuit that executes the programs stored in the ROM to serve as the drive planning device 20, and a random access memory (RAM) that serves as an accessible storage device.

The drive planning processor 21 determines a driving action to respond to another vehicle V2 traveling along the interference traffic line 2 of which the necessary length is determined by the evaluation processor 11. Driving actions to be determined include a traveling action and a stopping action. The drive planning processor 21 determines either the traveling action or the stopping action for each interference traffic line. The drive planning processor 21 comprehensively takes into account the content of each action determined for each interference traffic line to plan a series of driving actions for a scene which the subject vehicle encounters. Through this operation, the driving action can be planned in which it is made clear where the subject vehicle should make a stop from start of passing through a scene to completion of passing through the scene.

Figure 13:
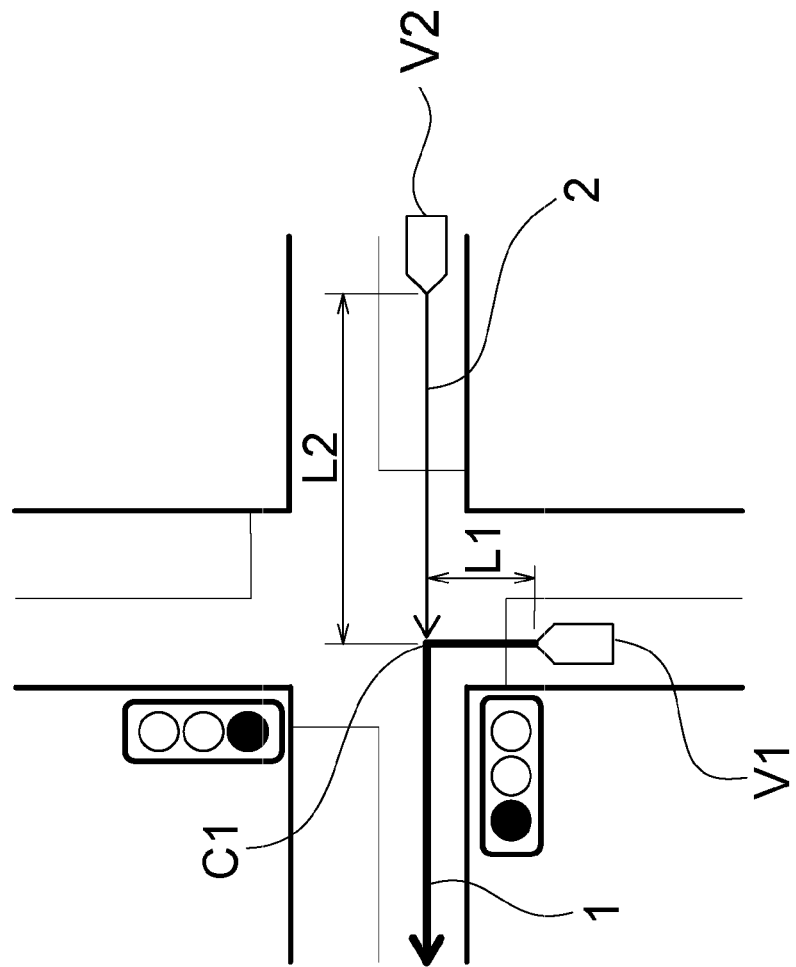
FIG. 13 is a diagram for describing a scheme of determining a driving action to respond to the interference traffic line of another vehicle which travels in an intersection from the right side to the planned travel route of the subject vehicle.
Figure 14:
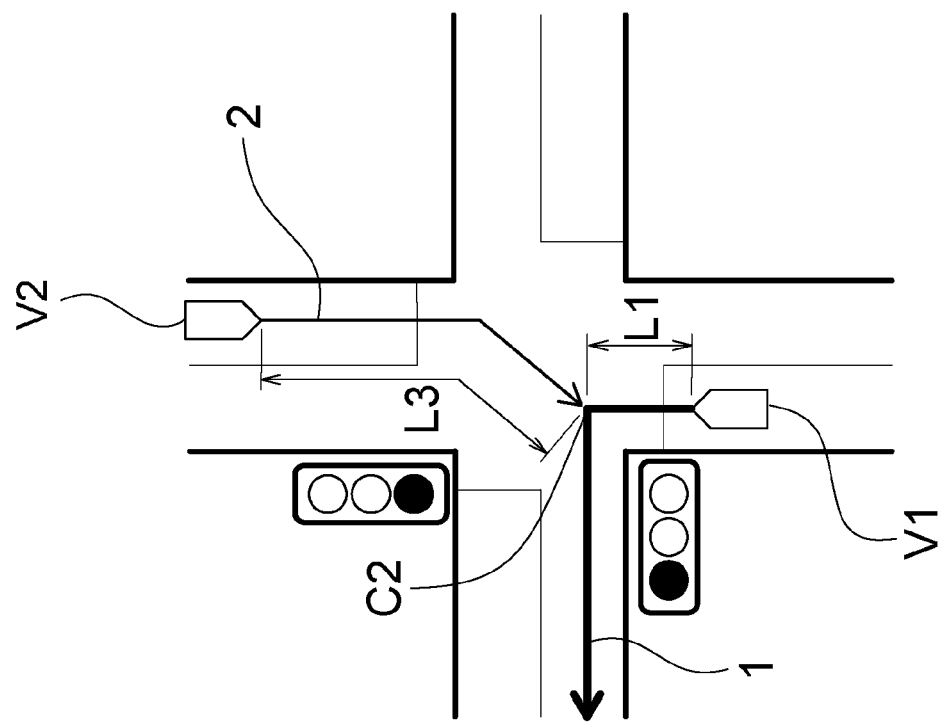
FIG. 14 is a diagram for describing a scheme of determining a driving action to respond to the interference traffic line of another vehicle which turns right from an oncoming lane and travels in an intersection to the planned travel route of the subject vehicle.

FIG. 13 is a diagram for describing a scheme of determining a driving action to respond to the interference traffic line 2 of another vehicle V2 which intersects with the planned travel route 1 of the subject vehicle V1 from the right side. FIG. 14 is a diagram for describing a scheme of determining a driving action to respond to the interference traffic line 2 of another vehicle V3 which intersects with the planned travel route 1 of the subject vehicle V1 after right turn from the oncoming lane.

In the scene illustrated in FIG. 13, the drive planning processor 21 determines the driving action to be taken for an event that the subject vehicle V1 passes through the point at which the planned travel route 1 of the subject vehicle V1 intersects with the interference traffic line 2 of another vehicle V2. The drive planning processor 21 calculates the positional relationship between the subject vehicle V1 and the other vehicle V2 associated with the interference traffic line 2 and the change in the positional relationship (degree of approaching). On the basis of the time remaining for the subject vehicle V1 to come into contact with the other vehicle V2, the drive planning processor 21 determines whether or not the subject vehicle V1 can pass through a point of intersection C1 between the planned travel route 1 and the interference traffic line 2 without coming into contact with the other vehicle V2.

The drive planning processor 21 calculates an estimated time for each of the subject vehicle V1 and the other vehicle V2 to arrive at the point of intersection C1 and determines whether or not the subject vehicle V1 can pass through the point of intersection C1 with a margin. Assume, for example, that the speed of the subject vehicle V1 is VV1, the distance from the subject vehicle V1 to the point of intersection C1 is L1, the speed of the other vehicle V2 is VV2, and the distance from the other vehicle V2 to the point of intersection C1 is L2.

When the following Expression (1) is satisfied, the drive planning processor 21 determines that the subject vehicle V1 is highly likely to come into contact with the other vehicle V2 at the point of intersection C1, and determines that the driving action at the point of intersection C1 is "stopping." As used herein, $T_{threshold}$ represents a margin time that is set with consideration for the safety when vehicles cross each other.

$$|L2/VV2-L1/VV1|<T_{threshold} \tag{1}$$

On the other hand, when the following Expression (2) is satisfied, the drive planning processor 21 determines that the subject vehicle V1 is unlikely to come into contact with the other vehicle V2 at the point of intersection C1, and determines that the driving action at the point of intersection C1 is "traveling."

$$|L2/VV2-L1/VV1|>T_{threshold} \tag{2}$$

In the scene illustrated in FIG. 14, the drive planning processor 21 determines the driving action to be taken for an event that the subject vehicle V1 passes through the point at which the planned travel route 1 of the subject vehicle V1 intersects with the interference traffic line 2 of another vehicle V2. The drive planning processor 21 calculates the positional relationship between the subject vehicle V1 and the other vehicle V2 associated with the interference traffic line 2 and the change in the positional relationship (degree of approaching). On the basis of the time remaining for the subject vehicle V1 to come into contact with the other vehicle V2, the drive planning processor 21 determines whether or not the subject vehicle V1 can pass through a point of intersection C2 between the planned travel route 1 and the interference traffic line 2 without coming into contact with the other vehicle V2.

The drive planning processor 21 calculates an estimated time for each of the subject vehicle V1 and the other vehicle V2 to arrive at the point of intersection C2 and determines whether or not the subject vehicle V1 can pass through the point of intersection C2 with a margin. Assume, for example, that the speed of the subject vehicle V1 is VV1, the distance from the subject vehicle V1 to the point of intersection C2 is L1, the speed of the other vehicle V2 is VV3, and the distance from the other vehicle V2 to the point of intersection C2 is L3. The distance L3 may be calculated with reference to the curvature or the like stored as a part of the road information 223 and may also be calculated with reference to the distance between nodes which is stored as a part of the road information 223.

When the following Expression (3) is satisfied, the drive planning processor 21 determines that the subject vehicle V1 is highly likely to encounter an event of coming into contact with the other vehicle V2 at the point of intersection C2, and determines that the driving action in this event is "stopping."

$$|L3/VV3-L1/VV1|<T_{threshold} \tag{3}$$

On the other hand, when the following Expression (4) is satisfied, the drive planning processor 21 determines that the subject vehicle V1 is unlikely to encounter an event of coming into contact with the other vehicle V2 at the point of intersection C2, and determines that the driving action in this event is "traveling."

$$|L3/VV3-L1/VV1|>T_{threshold} \qquad (4)$$

The drive planning processor 21 plans a series of driving actions of the subject vehicle V1 using the relationships with a plurality of interference traffic lines 2 that encounter the planned travel route 1 of the subject vehicle V1 in a time-series manner. The driving actions refer to instructions in which commands of stopping or traveling are associated with respective interference traffic lines 2 that interfere with the planned travel route 1, for example, from when entering a certain area such as an intersection to when exiting the certain area.

When a determination of the traveling action is made for an interference traffic line 2 and a determination of the stopping action or of being undeterminable is made for another interference traffic line 2 to be encountered next to the that interference traffic line 2, the drive planning processor 21 plans a driving action of controlling the subject vehicle V1 to make a stop at the point of intersection between the planned travel route 1 and the interference traffic line 2 for which the traveling action is determined. Even in a case in which the traveling action is once determined, when the interference traffic line 2 which the subject vehicle V1 encounters next requires the stopping action or is undeterminable, the subject vehicle V1 can be controlled to make a stop at a position for which the traveling action is determined. The location for which the traveling action is determined is a location in which the subject vehicle V1 is permitted to stay, and the subject vehicle V1 can therefore be controlled to make a stop in safety.

When the point of intersection between the planned travel route 1 and an interference traffic line 2 for which a determination of the stopping action or of being undeterminable is made belongs to another interference traffic line 2, the drive planning processor 21 plans a driving action of controlling the subject vehicle V1 to make a stop at a position which is located at the further upstream side than the point of intersection and at which stopping is possible. Here, even in a case in which a determination of the stopping action or of being undeterminable is made for an interference traffic line 2, when the stop position corresponding to the interference traffic line 2 belongs to another interference traffic line 2, the subject vehicle V1 may obstruct another vehicle V2 traveling along the other interference traffic line 2. Thus, the stop position is inappropriate. The driving action is therefore planned such that the stop position is set at the upstream position at which stopping is possible, rather than within the other interference traffic line 2.

When a determination of the stopping action or of being undeterminable is made for an interference traffic line 2 and the point of intersection between the interference traffic line 2 and the planned travel route 1 is close to or overlaps the point of intersection between another interference traffic line 2 and the planned travel route 1 so that these points of intersection are located within a predetermined distance, the drive planning processor 21 plans a driving action of controlling the subject vehicle V1 to make a stop at a position which is located at the further upstream side than these points of intersection and at which stopping is possible. Even in a case in which a determination of the stopping action or of being undeterminable is made for an interference traffic line 2, when the stop position for the interference traffic line 2 is close to or overlaps the stop position for another interference traffic line 2, matching with the determination for the other interference traffic line 2 may have to be taken into account. The stop position is therefore inappropriate. The driving action is therefore planned such that the stop position is set at the upstream position at which stopping is possible, rather than within the other interference traffic line 2. This can reduce the cases of being undeterminable. Moreover, the load of determination processes can be reduced and the subject vehicle V1 can travel smoothly without repeating stop-and-go driving.

When a determination of the traveling action is made for one interference traffic line 2 and a determination of the stopping action or of being undeterminable is made for another interference traffic line 2 to be encountered next to the one interference traffic line 2, the drive planning processor 21 plans a driving action of controlling the subject vehicle V1 to travel along the one interference traffic line 2, provided that a degree of separation between the one interference traffic line 2 and the other interference traffic line 2 is a predetermined value or more. When traveling is permitted for one interference traffic line 2, but a determination of the stopping action or of being undeterminable is made for another interference traffic line 2 to be thereafter encountered, if the subject vehicle V1 is controlled to make a stop at the upstream one interference traffic line 2, a determination has to be made again as to whether or not the traveling along the other interference traffic line 2 is allowed, and the subject vehicle V1 may interfere with the traffic stream of another vehicle V2 on the other interference traffic line 2. Thus, when separate events are determined in different ways: "traveling" at the upstream side and "stopping" at the downstream side, a driving action of controlling the subject vehicle V1 to travel along the upstream interference traffic line 2 is planned thereby to prevent the process from being complexed.

Here, when the road to which an interference traffic line 2 belongs is included in the detection range of the object detection device 230, the drive planning processor 21 determines a driving action and outputs it to the vehicle controller 210. The vehicle controller 210 outputs control signals to the drive device 270 and the steering device 280 when a driving action is output from the drive planning processor 21. This allows the drive device 270 and/or the steering device 280 to be controlled in a completely automated manner or in a form of assisting with the driving operation (traveling operation) of the driver.

On the other hand, when the road to which an interference traffic line 2 belongs is not included in the detection range of the object detection device 230, the drive planning processor 21 cannot determine a driving action because of an undeterminable state and therefore does not output a driving action to the vehicle controller 210. In this case, the vehicle controller 210 does not output control signals to the drive device 270 and the steering device 280, and the control of the drive device 270 and steering device 280 performed in a completely automated manner or in a form of assisting with the driving operation of the driver is suspended/canceled.

The drive planning processor 21 uses the necessary length of the interference traffic line 2 determined by the evaluation processor 11 as a determination object to determine a driving action to respond to the interference traffic line 2 and outputs the driving action to the vehicle controller 210. Here, the detection range for objects assigned to the object detection device 230 includes not only a range of the necessary length of the interference traffic line 2 but also a range outside the necessary length of the interference traffic line 2. When detecting an object, the object detection device 230 outputs the detection signal to the vehicle controller 210 even while the control of the drive device 270 and steering device 280 is performed in a completely automated manner or in a form of assisting with the driving operation of the driver. When the object detection device 230 detects an object in a range outside the necessary length of the interference traffic line 2 while the control of the drive device 270 and steering device 280 is performed in a completely automated manner or the like, the vehicle controller 210 may suspend/cancel the control of the drive device 270 and steering device 280, which is performed in a completely automated manner or the like, in accordance with the positional relationship between the detected object and the subject vehicle V1 and/or may output control signals for avoiding contact between the subject vehicle and the object to the drive device 270 and the steering device 280.

The output device 30 includes an output control processor 31. The output control processor 31 displays information using the display 251 as the output device 30. The output control processor 31 displays information items representing the interference traffic lines 2 selected by the evaluation processor in the order of encounters with the subject vehicle V1 and in a side-by-side fashion.

The output control processor 31 is a computer comprising a read only memory (ROM) that stores programs for executing a process of displaying the information items representing the interference traffic lines, a central processing unit (CPU) as an operation circuit that executes the programs stored in the ROM to serve as the output device 30, and a random access memory (RAM) that serves as an accessible storage device.

Figure 15:
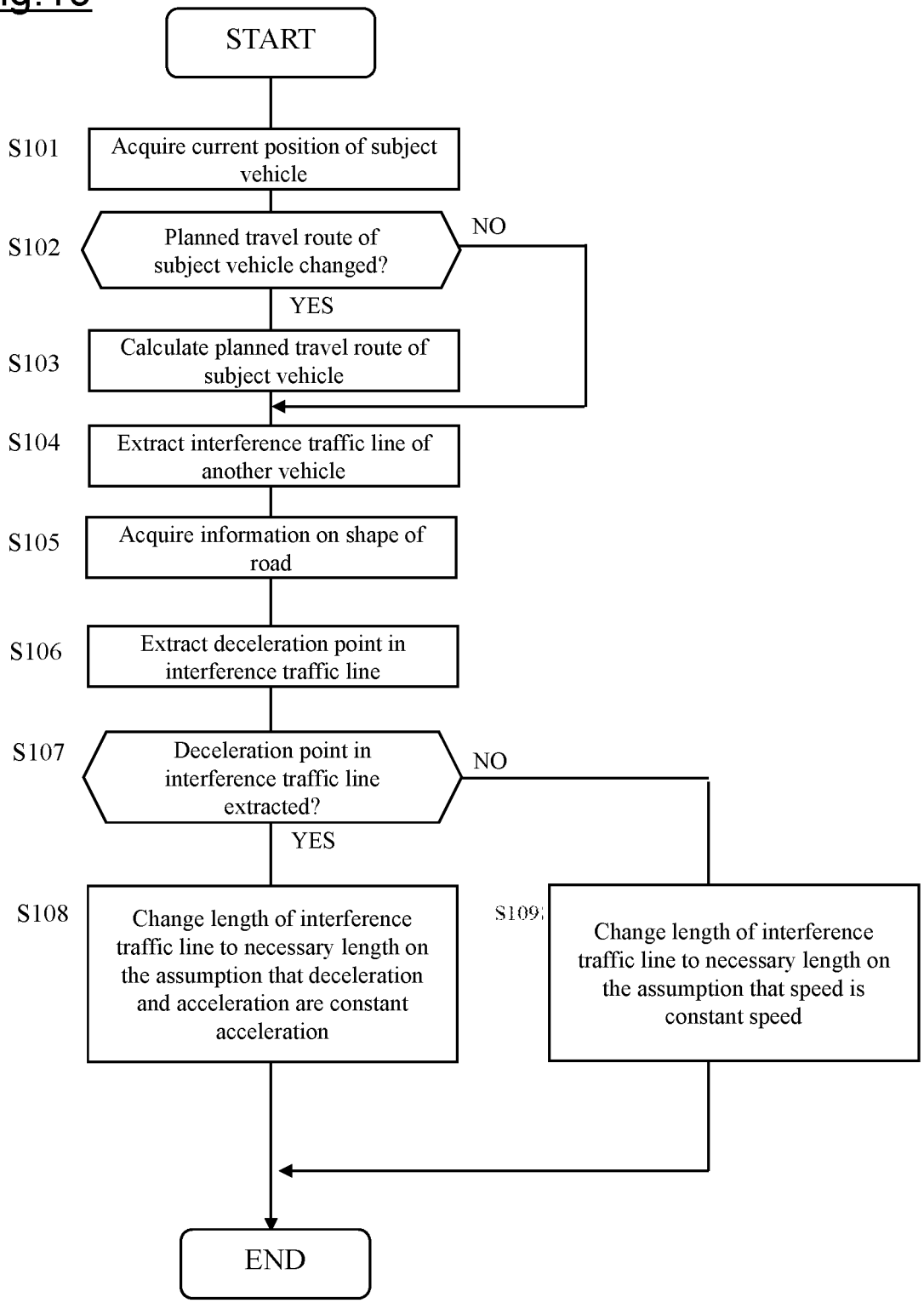
FIG. 15 is a flowchart for describing a process of determining the necessary length of the interference traffic line in accordance with deceleration of another vehicle using an evaluation processor.

FIG. 15 is a flowchart for describing a process of determining the necessary length of the interference traffic line 2 in accordance with deceleration of another vehicle V2 using the evaluation processor 11 of the scene evaluation device 10 (see FIG. 3 to FIG. 7). As illustrated in the flowchart, first, in step S101, the evaluation processor 11 acquires the current position of the subject vehicle V1 from the navigation device 220. Then, in step S102, the evaluation processor 11 determines whether or not the calculated planned travel route 1 of the subject vehicle V1 is changed. A negative determination in this step is followed by step S104 while an affirmative determination is followed by step S103. In step S103, the evaluation processor 11 calculates the planned travel route 1 of the subject vehicle V1 on the basis of the current position of the subject vehicle V1, the target route, and the map information 222.

Then, in step S104, the evaluation processor 11 extracts the interference traffic line 2 of another vehicle V2 on the basis of the calculated planned travel route 1 of the subject vehicle V1, the map information 222, and the road information 223. Then, in step S105, the evaluation processor 11 acquires information on the shape of the road to which the interference traffic line 2 of the other vehicle V2 belongs, from the road information 223 or the like.

Then, in step S106, the evaluation processor 11 extracts a point at which deceleration of the other vehicle V2 occurs in the interference traffic line 2, on the basis of the information regarding the road shape. Then, in step S107, the evaluation processor 11 determines whether or not a point at which deceleration of the other vehicle V2 occurs in the interference traffic line 2 is extracted. An affirmative determination in this step is followed by step S108 while a negative determination is followed by step S109.

In step S108, the evaluation processor 11 calculates an estimated value of the moving speed of the other vehicle V2 by setting the deceleration of the other vehicle V2 to a predetermined value and setting the acceleration of the other vehicle V2 to a predetermined value when acceleration of the other vehicle V2 occurs after the deceleration, and calculates the necessary length of the interference traffic line 2 of the other vehicle V2 on the basis of the calculated estimated value of the moving speed. On the other hand, in step S109, the evaluation processor 11 calculates an estimated value of the moving speed of the other vehicle V2 by setting the moving speed of the other vehicle V2 to a predetermined constant speed, such as a speed limit, and calculates the necessary length of the interference traffic line 2 of the other vehicle V2 on the basis of the calculated estimated value of the moving speed. The process is thus completed.

Figure 16:
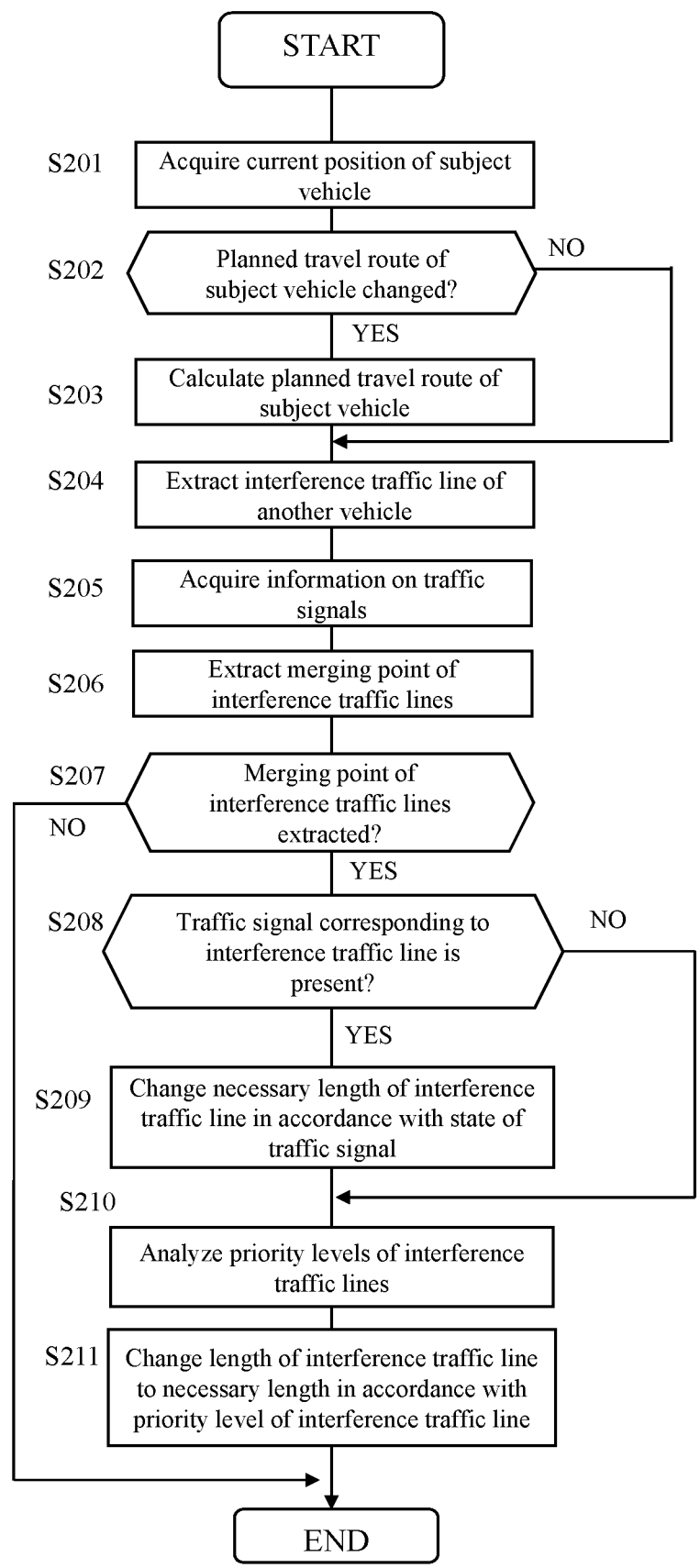
FIG. 16 is a flowchart for describing a process of determining the necessary length of the interference traffic line in accordance with the state of traffic signals and the priority levels of a plurality of interference traffic lines that merge into one another using the evaluation processor.

FIG. 16 is a flowchart for describing a process of determining the necessary length of the interference traffic line 2 in accordance with the state of traffic signals and the priority levels under the traffic rules of a plurality of interference traffic lines 2 that merge into one another using the evaluation processor 11 (see FIG. 8 and FIG. 9). Steps S201 to S204 illustrated in this flowchart are the same as steps S101 to S104 illustrated in the flowchart of FIG. 15, so repetitive description will be omitted and the already-explained description will be borrowed herein.

Step S204 is followed by step S205 in which the evaluation processor 11 acquires information on the traffic signals around the subject vehicle V1 from the object detection device 230 or the like. Then, in step S206, the evaluation processor 11 refers to the map information 222 and the road information 223 to extract a merging point at which a plurality of interference traffic lines 2 merges into one another. Then, in step S207, the evaluation processor 11 determines whether or not a merging point at which a plurality of interference traffic lines 2 merges into one another is extracted. An affirmative determination in this step is followed by step S208. When a negative determination is made, the process is ended. That is, when a merging point at which a plurality of interference traffic lines 2 merges into one another is not extracted, the process is ended without changing the length of the interference traffic line 2.

In step S208, the evaluation processor 11 determines whether or not a traffic signal corresponding to the interference traffic line 2 is present. An affirmative determination in this step is followed by step S209 while a negative determination is followed by step S210. In step S209, the evaluation processor 11 changes the necessary length of the interference traffic line 2 in accordance with the state of the corresponding traffic signal. In this step, for example, as illustrated in FIG. 8, the necessary length of the interference traffic line 2 corresponding to the traffic signal 3 in the impassable state is changed to 0 m.

Then, in step S210, the evaluation processor 11 refers to the road information 223 and the traffic rule information 224 to analyze the priority levels under the traffic rules of the plurality of interference traffic lines 2 that merges into one another. Then, in step S211, the evaluation processor 11 calculates the necessary length of the interference traffic line 2B having a lower priority level among the plurality of interference traffic lines 2 that merge into one another, on the assumption that the moving speed of another vehicle V2 is 0 km/h in the vicinity of the intersection 5 between the road to which the interference traffic line 2B belongs and the road to which the interference traffic line 2A having a higher priority level belongs. On the other hand, the necessary length of the interference traffic line 2A having a higher priority level is calculated on the assumption that another vehicle passes through the vicinity of the intersection 5 at a given constant speed. The process is thus completed.

Figure 17:
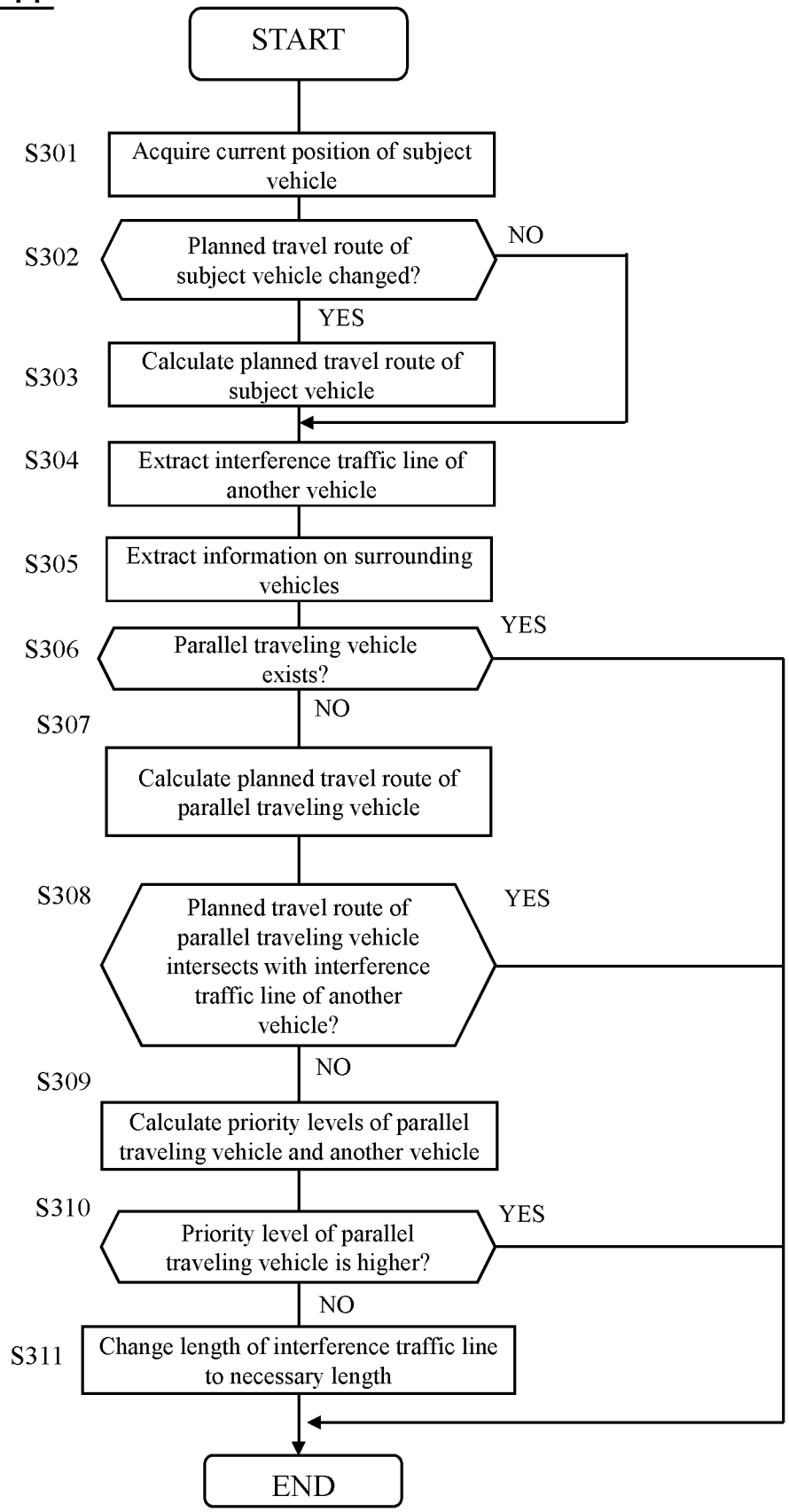
FIG. 17 is a flowchart for describing a process of determining the necessary length of the interference traffic line at an intersection in accordance with the planned travel route of a parallel traveling vehicle and the traffic rules.

FIG. 17 is a flowchart for describing a process of determining the necessary length of the interference traffic line 2 in accordance with the planned travel route 6 of the parallel traveling vehicle V3 and the priority level under the traffic rules (see FIG. 10 to FIG. 12). Steps S301 to S304 illustrated in this flowchart are the same as steps S101 to S104 illustrated in the flowchart of FIG. 15, so repetitive description will be omitted and the already-explained description will be borrowed herein.

Step S304 is followed by step S305 in which the evaluation processor 11 acquires information on the positions, speeds, and movement vectors of other vehicles around the subject vehicle V1 from the object detection device 230 or the like. Then, in step S306, the evaluation processor 11 determines whether or not a parallel traveling vehicle V3 traveling parallel to the subject vehicle V1 exists, on the basis of the information acquired from the object detection device 230 or the like. An affirmative determination in this step is followed by step S307. When a negative determination is made, the process is ended.

In step S307, the evaluation processor 11 calculates the planned travel route 6 of the parallel traveling vehicle V3. Then, in step S308, the evaluation processor 11 determines whether or not the interference traffic line 2 of another vehicle V2 intersecting with the planned travel route 6 of the parallel traveling vehicle V3 exists. An affirmative determination in this step is followed by step S309. When a negative determination is made, the process is ended.

In step S309, the evaluation processor 11 calculates the priority levels under traffic rules of the parallel traveling vehicle V3 and the other vehicle V2 which is traveling along the interference traffic line 2. Then, in step S310, the evaluation processor 11 determines whether or not the priority level of the parallel traveling vehicle V3 is higher than the priority level of the other vehicle V2 traveling along the interference traffic line 2. An affirmative determination in this step is followed by step S311. When a negative determination is made, the process is ended. Through this operation, as for the interference traffic line 2 of the other vehicle V2 having a higher priority level than that of the parallel traveling vehicle V3, the process is ended without changing the length. On the other hand, in step S311, the evaluation processor 11 changes the length of the interference traffic line 2 of the other vehicle V2 having a lower priority level than that of the parallel traveling vehicle V3 to the necessary length. The process is thus completed.

As described above, in the driving assistance method and apparatus according to one or more embodiments of the present invention, the interference traffic line 2 of another vehicle V2 interfering with the planned travel route 1 of the subject vehicle V1 is extracted, the necessary length of the extracted interference traffic line necessary for determining a driving action of the subject vehicle V1 is determined on the basis of at least one of a road shape, a traffic rule, and a traffic situation, and the driving action of the subject vehicle V1 to respond to the other vehicle V2 moving along the interference traffic line 2 is determined using a range of the determined necessary length of the interference traffic line 2 as a determination object. Through this operation, the range for search when determining the driving action of the subject vehicle V1 can be set as an appropriate range in accordance with the necessity for determining the driving action of the subject vehicle V1. It is therefore possible to suppress the occurrence of a range in which perception by the object detection device 230 is not possible in the range for search when determining the driving action and also to suppress the occurrence of a situation in which the determination of a driving action is difficult. Moreover, the load of a determination process for the driving action can be mitigated by limiting the range for search when determining the driving action of the subject vehicle V1 and it is therefore possible to reduce the time for the process and prevent the occurrence of a delay of the process.

In the driving assistance method and apparatus according to one or more embodiments of the present invention, the moving speed of another vehicle V2 moving along the interference traffic line 2 is estimated on the basis of the shape of a road, and the necessary length of the interference traffic line 2 necessary for determining a driving action of the subject vehicle V1 is determined on the basis of the estimated moving speed of the other vehicle V2 (see FIG. 3 to FIG. 7). For example, deceleration of the other vehicle V2 is estimated in accordance with the curvature of a road, the gradient of a road, or the existence of irregularities on a road surface, and the necessary length of the interference traffic line 2 is determined in accordance with the deceleration. Through this operation, the range for search when determining the driving action of the subject vehicle V1 can be set as an appropriate range in accordance with an actual traveling situation of the other vehicle V2.

In the driving assistance method and apparatus according to one or more embodiments of the present invention, the merging point of a plurality of interference traffic lines 2 of other vehicles V2 merging into one another is extracted on the basis of the shape of a road, the moving speed of another vehicle V2 at the above merging point is estimated on the basis of at least one of the shape of the road and a traffic rule, and the necessary length of the interference traffic line 2 necessary for determining the driving action of the subject vehicle V1 is determined on the basis of the estimated moving speed of the other vehicle V2 (see FIG. 9). For example, when priority levels under traffic rules exist at a merging point of a plurality of other vehicles V2 moving along a plurality of interference traffic lines 2 that merge into one another, deceleration of another vehicle V2 traveling from a non-priority road to a priority road is estimated and the necessary length of the interference traffic line 2 is determined in accordance with the deceleration. Through this operation, the range for search when determining the driving action of the subject vehicle V1 can be set as an appropriate range in accordance with an actual traveling situation of the other vehicle V2.

In the driving assistance method and apparatus according to one or more embodiments of the present invention, the moving speed of another vehicle V2 is estimated on the basis of deceleration of the other vehicle V2 turning right or left at an intersection, and the necessary length of the interference traffic line 2 necessary for determining the driving action of the subject vehicle V1 is determined on the basis of the estimated moving speed of the other vehicle V2 (see FIG. 7). Through this operation, the range for search when determining the driving action of the subject vehicle V1 can be set as an appropriate range in accordance with an actual traveling situation of the other vehicle V2.

In the driving assistance method and apparatus according to one or more embodiments of the present invention, the necessary length of the interference traffic line 2 of another vehicle V2 is determined on the basis of the state of a traffic signal corresponding to the interference traffic line 2 of the other vehicle V2 (see FIG. 8). Through this operation, the range for search when determining the driving action of the subject vehicle V1 can be set as an appropriate range in accordance with an actual traveling situation of the other vehicle V2.

In the driving assistance method and apparatus according to one or more embodiments of the present invention, information regarding a traffic situation including the positions and moving directions of traveling vehicles traveling around the subject vehicle V1 is acquired and the necessary length of the interference traffic line 2 of another vehicle V2 is determined on the basis of the positions and moving directions of the above traveling vehicles (see FIG. 10 to FIG. 12). For example, the planned travel route 6 of a parallel traveling vehicle V3 traveling parallel to the subject vehicle V1 is extracted, the interference traffic line 2 of another vehicle V2 interfering with the extracted planned travel route 6 of the parallel traveling vehicle V3 is extracted, and the priority levels under traffic rules of the other vehicle V2 moving along the interference traffic line 2 and the parallel traveling vehicle V3 are obtained. Then, when the priority level of the other vehicle V2 moving along the interference traffic line 2 is lower than the priority level of the parallel traveling vehicle V3, the length of the interference traffic line 2 from the point of intersection with the planned travel route 6 of the parallel traveling vehicle V3 to the point of intersection with the planned travel route 1 of the subject vehicle V1 is determined as the necessary length of the interference traffic line 2. Through this operation, the range for search when determining the driving action of the subject vehicle V1 can be set as an appropriate range in accordance with an actual traveling situation of the other vehicle V2 and the parallel traveling vehicle V3.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the road shape has been exemplified with reference to a road having an intersection, a T-junction, a bump on the road surface, or a railroad crossing, but the necessary length of the interference traffic line 2 may also be determined on the basis of the information regarding other road shapes, such as the number of lanes and a junction of three or more streets. In the above-described embodiments, the traffic rules have been exemplified with reference to the traffic restriction due to traffic signals, the traffic rule that vehicles traveling straight ahead or turning left on an intersection have higher priority levels than those of oncoming vehicles turning right, the traffic restriction due to a railroad crossing, the traffic rule due to a priority road, etc., but the necessary length of the interference traffic line 2 may also be determined on the basis of the information regarding other traffic rules, such as a traffic restriction due to STOP. Furthermore, the traffic situation has been exemplified with reference to a situation in which a parallel traveling vehicle exists, but the necessary length of the interference traffic line 2 may also be determined on the basis of the information regarding other traffic situations such as a situation in which a number of oncoming vehicles exist (i.e. a situation in which, when the subject vehicle turns left, the necessary length of the interference traffic line of a vehicle traveling straight ahead from the right side can be reduced).

The scheme of determining a driving action is not limited to the above-described scheme and other appropriate schemes can also be selected.

DESCRIPTION OF REFERENCE NUMERALS

1 Planned travel route
2, 2A, 2B Interference traffic line
3 Traffic signal
5 Intersection
6 Planned travel route
8 Bump
9 Railroad crossing
100 Driving assistance apparatus
10 Scene evaluation device
11 Evaluation processor
20 Drive planning device
21 Drive planning processor
V1 Subject vehicle
V2 Another vehicle
V3 Parallel traveling vehicle

The invention claimed is:

1. A driving assistance method comprising:
   extracting an interference traffic line interfering with a planned travel route of a subject vehicle, the interference traffic line being a route along which another vehicle can move;
   determining a necessary length of the extracted interference traffic line on a basis of at least one of a shape of a road, a traffic rule, and a traffic situation, the necessary length being necessary for determining a driving action of the subject vehicle;
   detecting whether other vehicles moving along the interference traffic line exist within the necessary length of the interference traffic line;
   determining the driving action of the subject vehicle to avoid contact with the detected other vehicles; and
   controlling one or both of a drive device and a steering device based on the determined driving action.

2. The driving assistance method according to claim 1, comprising:
   estimating a moving speed of the other vehicle moving along the interference traffic line on the basis of the shape of the road; and
   determining the necessary length of the interference traffic line on a basis of the estimated moving speed.

3. The driving assistance method according to claim 2, comprising estimating the moving speed on a basis of a curvature of the road.

4. The driving assistance method according to claim 2, comprising estimating the moving speed on a basis of a gradient of the road.

5. The driving assistance method according to claim 2, comprising estimating the moving speed on a basis of existence of irregularities on a road surface of the road.

6. The driving assistance method according to claim 2, comprising:
   extracting a merging point of a plurality of the interference traffic lines merging into one another on the basis of the shape of the road; and
   estimating the moving speed at the merging point on the basis of at least one of the shape of the road and the traffic rule.

7. The driving assistance method according to claim 6, comprising estimating the moving speed at the merging point on a basis of priority levels under the traffic rule at the merging point of a plurality of other vehicles moving along the plurality of interference traffic lines merging into one another.

8. The driving assistance method according to claim 2, comprising estimating the moving speed on a basis of deceleration of the other vehicle turning right or left at an intersection.

9. The driving assistance method according to claim 2, comprising determining the necessary length of the interference traffic line on a basis of a state of a traffic signal corresponding to the interference traffic line.

10. The driving assistance method according to claim 2, comprising:
    acquiring information regarding a traffic situation including a position and a moving direction of a traveling vehicle traveling around the subject vehicle; and
    determining the necessary length of the interference traffic line on a basis of the position and moving direction of the traveling vehicle.

11. The driving assistance method according to claim 10, comprising:
    extracting a planned travel route of the traveling vehicle traveling parallel to the subject vehicle;
    extracting the interference traffic line interfering with the extracted planned travel route of the traveling vehicle;
    obtaining priority levels under the traffic rule of the other vehicle moving along the interference traffic line and the traveling vehicle;
    when the priority level of the other vehicle moving along the interference traffic line is lower than the priority level of the traveling vehicle, determining a length from a point of intersection on the interference traffic line with the planned travel route of the traveling vehicle to a point of intersection on the interference traffic line with the planned travel route of the subject vehicle as the necessary length.

12. A driving assistance apparatus comprising a processor configured to determine a driving action of a subject vehicle traveling along a planned travel route, the processor being configured to:
    extract an interference traffic line interfering with a planned travel route of a subject vehicle, the interference traffic line being a route along which another vehicle can move;
    determine a necessary length of the extracted interference traffic line on a basis of at least one of a shape of a road, a traffic rule, and a traffic situation, the necessary length being necessary for determining the driving action of the subject vehicle; and
    detect whether other vehicles moving along the interference traffic line exist within the necessary length of the interference traffic line;
    plan the driving action of the subject vehicle to avoid contact with the detected other vehicles; and
    control one or both of a drive device and a steering device based on the planned driving action.

* * * * *